(12) United States Patent
Bae et al.

(10) Patent No.: US 12,477,478 B2
(45) Date of Patent: Nov. 18, 2025

(54) METHOD FOR TRANSMITTING POWER HEADROOM REPORT, USER EQUIPMENT, PROCESSING DEVICE, STORAGE MEDIUM, AND COMPUTER PROGRAM

(71) Applicant: LG ELECTRONICS INC., Seoul (KR)

(72) Inventors: Duckhyun Bae, Seoul (KR); Hyunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 618 days.

(21) Appl. No.: 17/802,249

(22) PCT Filed: Apr. 9, 2021

(86) PCT No.: PCT/KR2021/004500
§ 371 (c)(1),
(2) Date: Aug. 25, 2022

(87) PCT Pub. No.: WO2021/206507
PCT Pub. Date: Oct. 14, 2021

(65) Prior Publication Data
US 2023/0092884 A1     Mar. 23, 2023

(30) Foreign Application Priority Data

Apr. 9, 2020    (KR) .................. 10-2020-0043378

(51) Int. Cl.
*H04W 72/04*       (2023.01)
*H04L 5/00*        (2006.01)
(Continued)

(52) U.S. Cl.
CPC ......... *H04W 52/365* (2013.01); *H04L 5/0051* (2013.01); *H04W 52/146* (2013.01); *H04W 72/23* (2023.01)

(58) Field of Classification Search
CPC . H04W 72/0446; H04W 72/21; H04W 48/12; H04W 72/232; H04W 72/50;
(Continued)

(56) References Cited

U.S. PATENT DOCUMENTS

2013/0010720 A1   1/2013 Lohr et al.
2019/0020456 A1   1/2019 Saxena et al.
(Continued)

FOREIGN PATENT DOCUMENTS

KR   1020120130100 A    11/2012
WO   WO-2015116866 A1 * 8/2015 .......... H04W 52/146

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321 V16.0.0 (Mar. 2020), Apr. 8, 2020.

*Primary Examiner* — Tu X Nguyen
(74) *Attorney, Agent, or Firm* — BRYAN CAVE LEIGHTON PAISNER LLP

(57) ABSTRACT

A UE determines a reference UL transmission from among a plurality of UL transmissions on the basis of i) power headroom reporting being triggered and ii) the plurality of UL transmissions overlapping in time on a serving cell of the UE with respect to UL transmission time, calculates a PH value for the serving cell on the basis of the reference UL transmission, and transmits the PHR including the PH value. The determining of the reference UL transmission from among the plurality of UL transmissions may include determining a UL transmission having a predetermined priority among the plurality of UL transmissions as the reference UL transmission.

8 Claims, 14 Drawing Sheets

(51) Int. Cl.
  *H04W 52/14* (2009.01)
  *H04W 52/36* (2009.01)
  *H04W 72/23* (2023.01)
(58) Field of Classification Search
  CPC ..... H04W 72/56; H04W 72/04; H04W 72/52; H04W 52/10; H04W 52/00; H04B 7/0413
  See application file for complete search history.

(56) References Cited

U.S. PATENT DOCUMENTS

2019/0313348 A1    10/2019  MolavianJazi et al.
2021/0307070 A1*    9/2021  Kim ................... H04L 25/0226

* cited by examiner

| $C_7$ | $C_6$ | $C_5$ | $C_4$ | $C_3$ | $C_2$ | $C_1$ | R |
|---|---|---|---|---|---|---|---|
| P | V | \multicolumn{6}{c}{PH (Type 2, SpCell of the other MAC entity)} |

| $C_7$ | $C_6$ | Content |
|---|---|---|
| P | V | PH (Type 2, SpCell of the other MAC entity) |
| R | R | $P_{CMAX,f,c}$ 1 |
| P | V | PH (Type 1, PCell) |
| R | R | $P_{CMAX,f,c}$ 2 |
| P | V | PH (Type X, Serving Cell 1) |
| R | R | $P_{CMAX,f,c}$ 3 |

...

| $C_7$ | $C_6$ | Content |
|---|---|---|
| P | V | PH (Type X, Serving Cell n) |
| R | R | $P_{CMAX,f,c}$ m |

(a)      (b)

METHOD FOR TRANSMITTING POWER HEADROOM REPORT, USER EQUIPMENT, PROCESSING DEVICE, STORAGE MEDIUM, AND COMPUTER PROGRAM

This application is the National Stage filing under 35 U.S.C. 371 of International Application No. PCT/KR2021/004500 filed on Apr. 9, 2021, which claims priority to Korean Patent Application No. 10-2020-0043378 filed on Apr. 9, 2020, the contents of which are all hereby incorporated by reference herein in their entirety.

TECHNICAL FIELD

The present disclosure relates to a wireless communication system.

BACKGROUND ART

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

DISCLOSURE

Technical Problem

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

The objects to be achieved with the present disclosure are not limited to what has been particularly described hereinabove and other objects not described herein will be more clearly understood by persons skilled in the art from the following detailed description.

Technical Solution

In one aspect of the present disclosure, provided herein is a method for transmitting a power headroom report (PHR) by a user equipment (UE) in a wireless communication system. The method may include: based on i) power headroom reporting being triggered and ii) a plurality of uplink (UL) transmissions overlapping with each other in time in a serving cell of the UE for a UL transmission occasion, determining a reference UL transmission among the plurality of UL transmissions; calculating a power headroom (PH) value for the serving cell based on the reference UL transmission; and transmitting the PHR including the PH value. Determining the reference UL transmission among the plurality of UL transmissions may include determining a UL transmission having a predetermined priority among the plurality of UL transmissions as the reference UL transmission.

In another aspect of the present disclosure, provided herein is a user equipment (UE) for transmitting a power headroom report (PHR) in a wireless communication system. The UE may include at least one transceiver; at least one processor; and at least one computer memory operably connectable to the at least one processor and having stored thereon instructions that, when executed, cause the at least one processor to perform operations. The operations may include: based on i) power headroom reporting being triggered and ii) a plurality of uplink (UL) transmissions overlapping with each other in time in a serving cell of the UE for a UL transmission occasion, determining a reference UL transmission among the plurality of UL transmissions; calculating a power headroom (PH) value for the serving cell based on the reference UL transmission; and transmitting the PHR including the PH value. Determining the reference UL transmission among the plurality of UL transmissions may include determining a UL transmission having a predetermined priority among the plurality of UL transmissions as the reference UL transmission.

In another aspect of the present disclosure, provided herein is a processing device operating in a wireless communication system. The processing device may include at least one processor; and at least one computer memory operably connectable to the at least one processor and having stored thereon instructions that, when executed, cause the at least one processor to perform operations. The operations may include: based on i) power headroom reporting being triggered and ii) a plurality of uplink (UL) transmissions overlapping with each other in time in a serving cell of the user equipment (UE) for a UL transmission occasion, determining a reference UL transmission among the plurality of UL transmissions; calculating a power headroom (PH) value for the serving cell based on the reference UL transmission; and transmitting a power headroom report (PHR) comprising the PH value. Determining the reference UL transmission among the plurality of UL transmissions may include determining a UL transmission having a predetermined priority among the plurality of UL transmissions as the reference UL transmission.

In another aspect of the present disclosure, provided herein is a computer-readable storage medium having stored thereon at least one computer program including instructions that, when executed by at least one processor, cause the at least one processor to perform operations for a user equipment. The operations may include: based on i) power headroom reporting being triggered and ii) a plurality of uplink (UL) transmissions overlapping with each other in time in a serving cell of the user equipment (UE) for a UL transmission occasion, determining a reference UL transmission among the plurality of UL transmissions; calculating a power headroom (PH) value for the serving cell based on the reference UL transmission; and transmitting a power headroom report (PHR) comprising the PH value. Determining the reference UL transmission among the plurality of UL transmissions may include determining a UL transmission having a predetermined priority among the plurality of UL transmissions as the reference UL transmission.

In another aspect of the present disclosure, provided herein is a computer program stored on a computer program readable storage medium, the computer program including at least one program code including instructions that, when executed, cause at least one processor to perform operations. The operations may include: based on i) power headroom reporting being triggered and ii) a plurality of uplink (UL) transmissions overlapping with each other in time in a serving cell of the user equipment (UE) for a UL transmission occasion, determining a reference UL transmission among the plurality of UL transmissions; calculating a power headroom (PH) value for the serving cell based on the reference UL transmission; and transmitting a power headroom report (PHR) comprising the PH value. Determining the reference UL transmission among the plurality of UL transmissions may include determining a UL transmission having a predetermined priority among the plurality of UL transmissions as the reference UL transmission.

In each aspect of the present disclosure, determining the reference UL transmission among the plurality of UL transmissions may include: based on more than one UL transmission having the predetermined priority among the plurality of UL transmissions, determining a dynamically scheduled UL transmission among the dynamically scheduled UL transmission and a configured UL transmission among the more than one UL transmission as the reference UL transmission.

In each aspect of the present disclosure, determining the reference UL transmission among the plurality of UL transmissions may include: based on i) more than one UL transmission having the predetermined priority among the plurality of UL transmissions and ii) the more than one UL transmissions being configured UL transmissions, determining a UL transmission having a lowest configuration index among the configured UL transmissions as the reference UL transmission.

In each aspect of the present disclosure, determining the reference UL transmission among the plurality of UL transmissions may include: based on i) more than one UL transmission having the predetermined priority among the plurality of UL transmissions, determining a UL transmission having a lowest modulation and coding scheme (MCS) index among the more than UL transmission as the reference UL transmission.

In each aspect of the present disclosure, the method or the operations may further include receiving a time division duplex (TDD) uplink-downlink (UL-DL) configuration. Determining the reference UL transmission among the plurality of UL transmissions may include determining the reference UL transmission among remaining UL transmissions except for a UL transmission canceled by the TDD UL-DL configuration.

In each aspect of the present disclosure, the method or the operations may further include receiving downlink control information including a slot format indicator for the serving cell. Determining the reference UL transmission among the plurality of UL transmissions may include determining the reference UL transmission among remaining UL transmissions except for a UL transmission canceled by the slot format indicator.

The foregoing solutions are merely a part of the examples of the present disclosure and various examples into which the technical features of the present disclosure are incorporated may be derived and understood by persons skilled in the art from the following detailed description.

Advantageous Effects

According to implementation(s) of the present disclosure, a wireless communication signal may be efficiently transmitted/received. Accordingly, the total throughput of a wireless communication system may be raised.

According to implementation(s) of the present disclosure, various services with different requirements may be efficiently supported in a wireless communication system.

According to implementation(s) of the present disclosure, delay/latency generated during radio communication between communication devices may be reduced.

The effects according to the present disclosure are not limited to what has been particularly described hereinabove and other effects not described herein will be more clearly understood by persons skilled in the art related to the present disclosure from the following detailed description.

DESCRIPTION OF DRAWINGS

The accompanying drawings, which are included to provide a further understanding of the present disclosure, illustrate examples of implementations of the present disclosure and together with the detailed description serve to explain implementations of the present disclosure.

MODE FOR INVENTION

Figure 1:
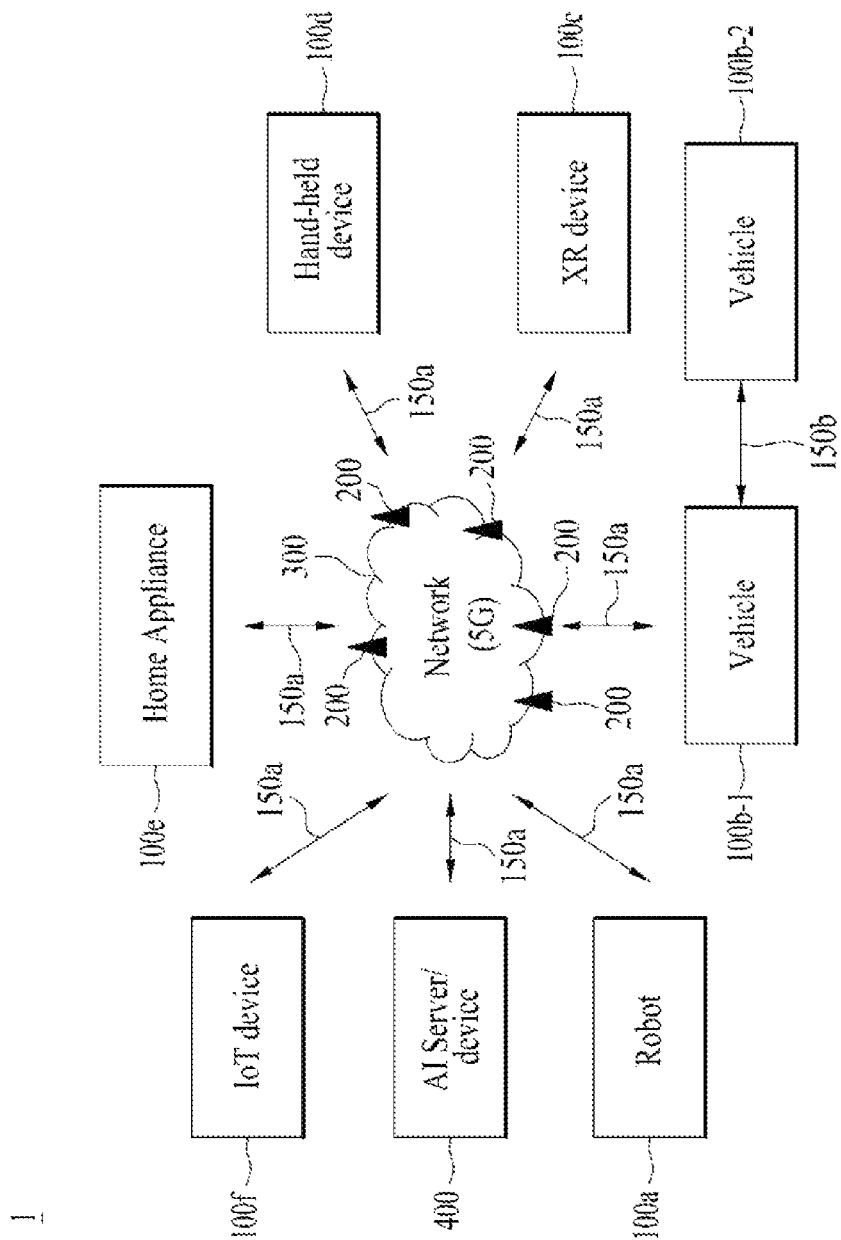
FIG. 1 illustrates an example of a communication system 1 to which implementations of the present disclosure are applied.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP based standard specifications, for example, 3GPP TS 36.211, 3GPP TS 36.212, 3GPP TS 36.213, 3GPP TS 36.321, 3GPP TS 36.300, 3GPP TS 36.331, 3GPP TS 37.213, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related with the radio resources is distinguished from a cell of a geographic area.

The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggregation (CA) is configured, the UE has only one radio resource control (RRC) connection with a network. During RRC connection establishment/re-establishment/handover, one serving cell provides non-access stratum (NAS) mobility information. During RRC connection re-establishment/handover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (Scells) may be configured to form a set of serving cells together with the Pcell. The Scell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (UL PCC). A carrier corresponding to the Scell on DL is referred to as a downlink secondary CC (DL SCC), and a carrier corresponding to the Scell on UL is referred to as an uplink secondary CC (UL SCC).

For dual connectivity (DC) operation, the term SpCell refers to the Pcell of a master cell group (MCG) or the Pcell of a secondary cell group (SCG). The SpCell supports PUCCH transmission and contention-based random access and is always activated. The MCG is a group of service cells associated with a master node (e.g., BS) and includes the SpCell (Pcell) and optionally one or more Scells. For a UE configured with DC, the SCG is a subset of serving cells associated with a secondary node and includes a PSCell and 0 or more Scells. For a UE in RRC_CONNECTED state, not configured with CA or DC, only one serving cell including only the Pcell is present. For a UE in RRC_CONNECTED state, configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

A UE with which CA is configured and DC is not configured may be configured with a Pcell PUCCH group, which includes the Pcell and 0 or more Scells, and an Scell PUCCH group, which includes only Scell(s). For the Scells, an Scell on which a PUCCH associated with the corresponding cell is transmitted (hereinafter, PUCCH cell) may be configured. An Scell indicated as the PUCCH Scell belongs to the Scell PUCCH group and PUCCH transmission of related UCI is performed on the PUCCH Scell. An Scell, which is not indicated as the PUCCH Scell or in which a cell indicated for PUCCH transmission is a Pcell, belongs to the Pcell PUCCH group and PUCCH transmission of related UCI is performed on the Pcell.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, the PDCCH refers to a set of time-frequency resource elements (REs) that carry downlink control information (DCI), and the PDSCH refers to a set of REs that carry DL data. The PUCCH, PUSCH, and PRACH refer to a set of time-frequency REs that carry uplink control information (UCI), UL data, and random access signals, respectively. In the following description, the meaning of "The UE transmits/receives the PUCCH/PUSCH/PRACH" is that the UE transmits/receives the UCI/UL data/random access signals on or through the PUCCH/PUSCH/PRACH, respectively. In addition, the meaning of "the BS transmits/receives the PBCH/PDCCH/PDSCH" is that the BS transmits the broadcast information/DCI/DL data on or through a PBCH/PDCCH/PDSCH, respectively.

In the present disclosure, a radio resource (e.g., a time-frequency resource) scheduled or configured for the UE by the BS for transmission or reception of PUCCH/PUSCH/PDSCH is also referred to as a PUCCH/PUSCH/PDSCH resource.

As more and more communication devices have required greater communication capacity, there has been a need for eMBB communication relative to legacy radio access technology (RAT). In addition, massive MTC for providing various services at any time and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, massive MTC, ultra-reliable and low-latency communication (URLLC), and the like. Currently, in 3GPP, a study on the next-generation mobile communication systems after EPC is being conducted. In the present disclosure, for convenience, the corresponding technology is referred to a new RAT (NR) or fifth-generation (5G) RAT, and a system using NR or supporting NR is referred to as an NR system.

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using RAT (e.g., 5G NR or LTE (e.g., E-UTRA)) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of Things (IoT) device 100f, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f and the BSs 200 and between the wireless devices 100a to 100f. Here, the wireless communication/connections such as UL/DL communication 150a and sidelink communication 150b (or, device-to-device (D2D) communication) may be established by various RATs (e.g., 5G NR). The wireless devices and the BSs/wireless devices may transmit/receive radio signals to/from each other through the wireless communication/connections 150a and 150b. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
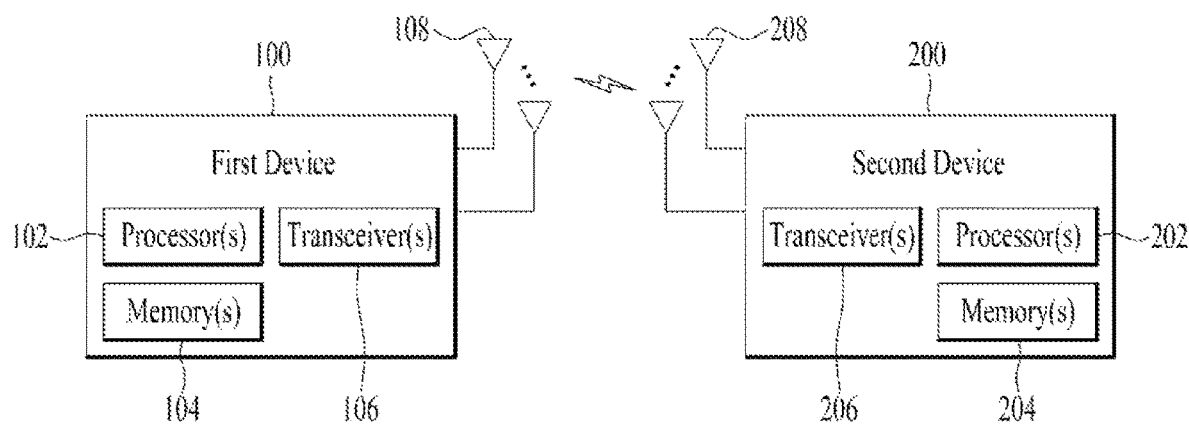
FIG. 2 is a block diagram illustrating examples of communication devices capable of performing a method according to the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs (e.g., LTE and NR). Here, {the first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the below-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the below-described/proposed procedures and/or methods. Here, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the afore/below-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the afore/below-described/proposed procedures and/or methods. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

The wireless communication technology implemented in the wireless devices 100 and 200 of the present disclosure may include narrowband Internet of Things for low-power communication as well as LTE, NR, and 6G communications. For example, NB-IoT technology may be an example of Low Power Wide Area Network (LPWAN) technology, and may be implemented by, but is limited to, standards such as LTE Cat NB1 and/or LTE Cat NB2. Additionally or alternatively, the wireless communication technology implemented in the wireless devices XXX and YYY of the present disclosure may perform communication based on the LTE-M technology. For example, the LTE-M technology may be an example of the LPWAN technology, and may be called by various names such as enhanced machine type communication (eMTC). For example, the LTE-M technology may be implemented by, but is not limited to, at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M. Additionally or alternatively, the wireless communication technology implemented in the wireless devices XXX and YYY of the present disclosure may include, but is not limited to, at least one of ZigBee, Bluetooth, and Low Power Wide Area Network (LPWAN) considering low-power communication. For example, the ZigBee technology may create personal area networks (PAN) related to small/low-power digital communications based on various standards such as IEEE 802.15.4, and may be called by various names.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in this document. The one or more processors 102 and 202 may generate messages, control information, data, or information according to the functions, procedures, proposals, and/or methods disclosed in this document. The one or more processors 102 and 202 may generate signals (e.g., baseband signals) including PDUs, SDUs, messages, control information, data, or information according to the functions, procedures, proposals, and/or methods disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in this document may be implemented using firmware or software, and the firmware or software may be configured to include the modules, procedures, or functions. Firmware or software configured to perform the functions, procedures, proposals, and/or methods disclosed in this document may be included in the one or more processors 102 and 202 or stored in the one or more memories 104 and 204 so as to be driven by the one or more processors 102 and 202. The functions, procedures, proposals, and/or methods disclosed in this document may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
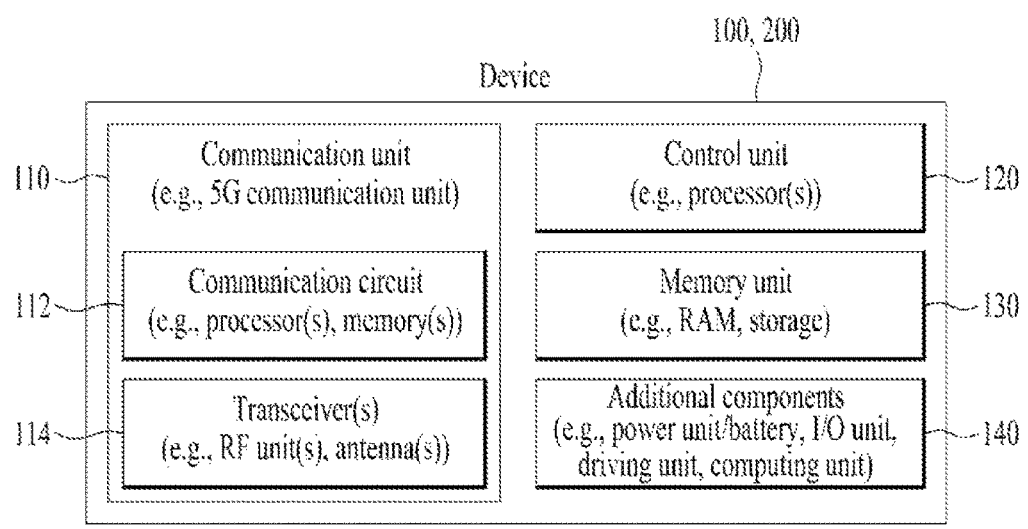
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-volatile memory, and/or a combination thereof.

In the present disclosure, the at least one memory (e.g., 104 or 204) may store instructions or programs, and the instructions or programs may cause, when executed, at least one processor operably connected to the at least one memory to perform operations according to some embodiments or implementations of the present disclosure.

In the present disclosure, a computer readable (non-transitory) storage medium may store at least one instruction or program, and the at least one instruction or program may cause, when executed by at least one processor, the at least one processor to perform operations according to some embodiments or implementations of the present disclosure.

In the present disclosure, a processing device or apparatus may include at least one processor, and at least one computer memory operably connected to the at least one processor. The at least one computer memory may store instructions or programs, and the instructions or programs may cause, when executed, the at least one processor operably connected to the at least one memory to perform operations according to some embodiments or implementations of the present disclosure.

In the present disclosure, the computer program may include a program code stored in at least one computer-readable (nonvolatile) storage medium and, when executed, performing operations according to some embodiments of the present disclosure or causing at least one processor to perform operations according to some embodiments of the present disclosure. The computer program may be provided in the form of a computer program product. The computer program product may include at least one computer-readable (nonvolatile) storage medium.

A communication device of the present disclosure includes at least one processor; and at least one computer memory operably connected to the at least one processor and configured to store instructions for causing, when executed, the at least one processor to perform operations according to example(s) of the present disclosure described later.

Figure 4:
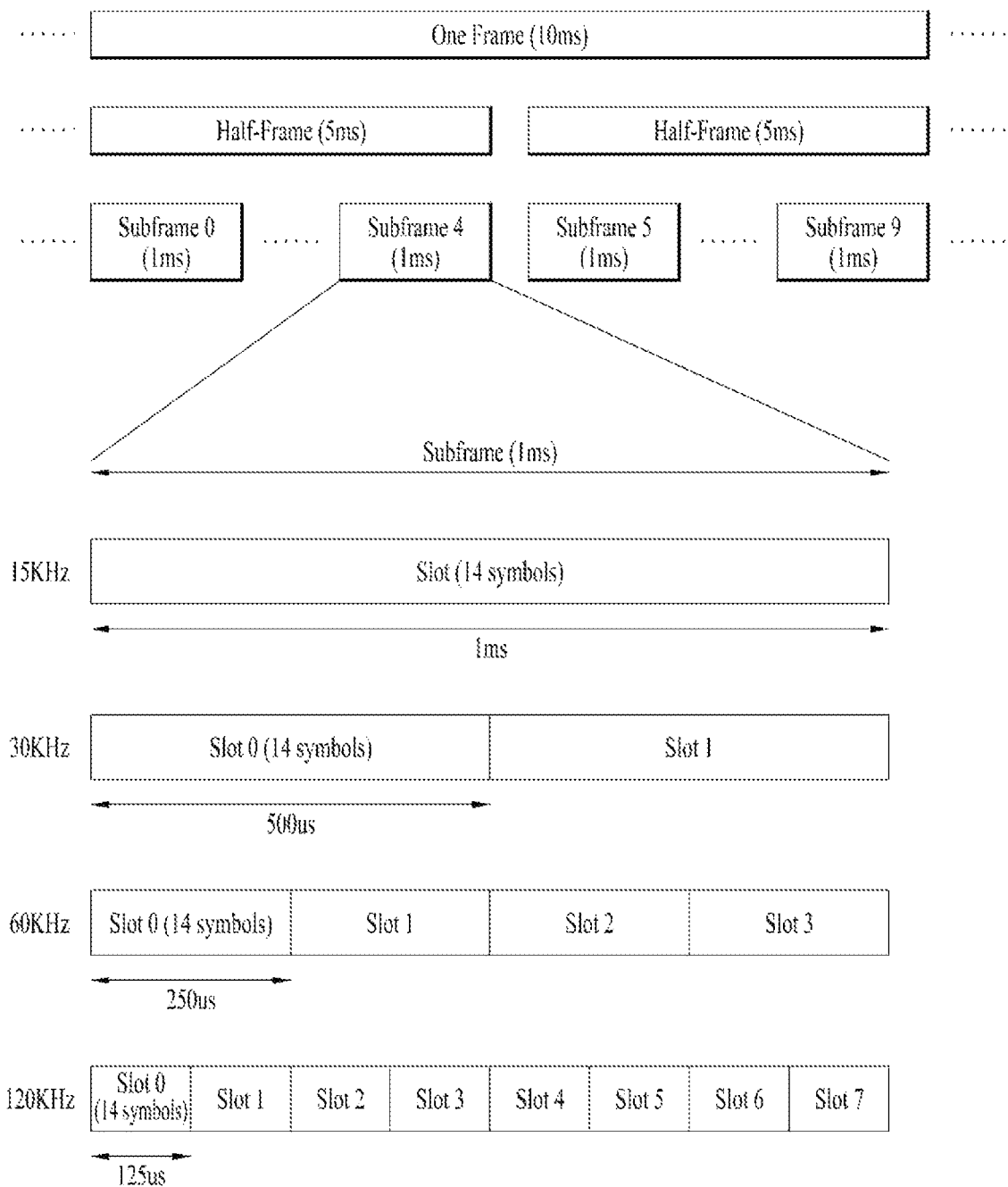
FIG. 4 illustrates an example of a frame structure used in a 3rd generation partnership project (3GPP)-based wireless communication system.

FIG. 4 illustrates an example of a frame structure used in a 3GPP-based wireless communication system.

The frame structure of FIG. 4 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix-OFDM (CP-OFDM) symbol) and an SC-FDMA symbol (or discrete Fourier transform-spread-OFDM (DFT-s-OFDM) symbol). In the present disclosure, the symbol, the OFDM-based symbol, the OFDM symbol, the CP-OFDM symbol, and the DFT-s-OFDM symbol are used interchangeably.

Referring to FIG. 4, in the NR system, UL and DL transmissions are organized into frames. Each frame has a duration of $T_f = (\Delta f_{max} * N_f / 100) * T_c = 10$ ms and is divided into two half-frames of 5 ms each. A basic time unit for NR is $T_c = 1/(\Delta f_{max} * N_f)$ where $\Delta f_{max} = 480 * 10^3$ Hz and $N_f = 4096$. For reference, a basic time unit for LTE is $T_s = 1/(\Delta f_{ref} * N_{f,ref})$ where $\Delta f_{ref} = 15 * 10^3$ Hz and $N_{f,ref} = 2048$. $T_c$ and $T_f$ have the relationship of a constant $\kappa = T_s/T_c = 64$. Each half-frame includes 5 subframes and a duration $T_{sf}$ of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable subcarrier spacing $\Delta f = 2^u * 15$ kHz. The table below shows the number of OFDM symbols ($N^{slot}_{symb}$) per slot, the number of slots ($N^{frame,u}_{slot}$) per frame, and the number of slots ($N^{subframe,u}_{slot}$) per subframe.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The table below shows the number of OFDM symbols per slot, the number of slots per frame, and the number of slots per subframe, according to the subcarrier spacing $\Delta f = 2^{u*} 15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

For the search space configuration u, slots are numbered as $n^u_s \in \{0, \ldots, n^{subframe,u}_{slot}-1\}$ in ascending order within a subframe and as $n^u_{s,f} \in \{0, \ldots, n^{frame,u}_{slot}-1\}$ in ascending order within a frame.

Figure 5:
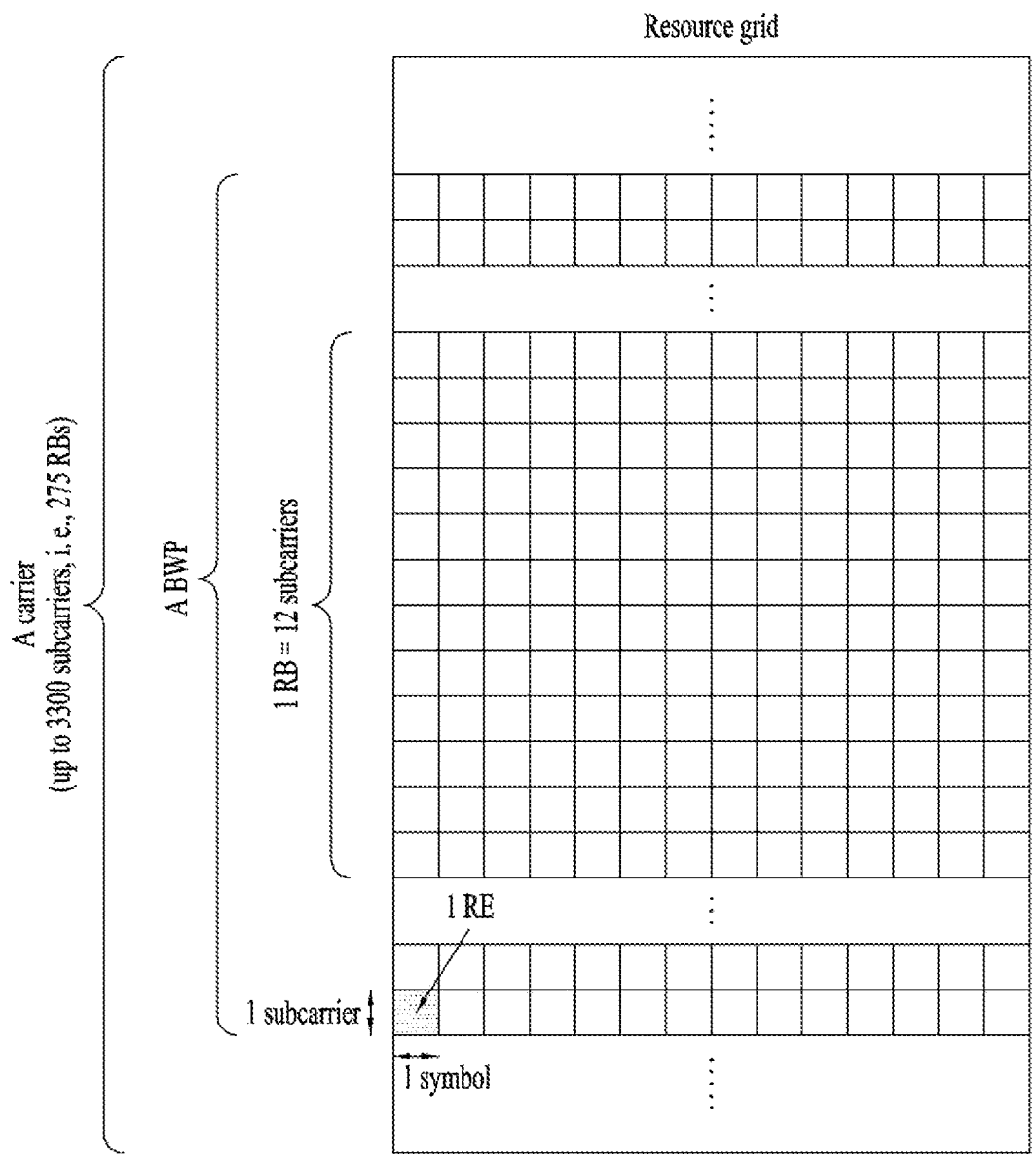
FIG. 5 illustrates a resource grid of a slot.

FIG. 5 illustrates a resource grid of a slot. The slot includes multiple (e.g., 14 or 12) symbols in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at a common resource block (CRB) $N^{start,u}_{grid}$ indicated by higher layer signaling (e.g. RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP-based wireless communication system, $N^{RB}_{sc}$ is typically 12. There is one resource grid for a given antenna port p, a subcarrier spacing configuration u, and a transmission link (DL or UL). The carrier bandwidth $N^{size,u}_{grid}$ for the subcarrier spacing configuration u is given to the UE by a higher layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the NR system, an RB is defined by 12 consecutive subcarriers in the frequency domain. In the NR system, RBs are classified into CRBs and physical resource blocks (PRBs). The CRBs are numbered from 0 upwards in the frequency domain for the subcarrier spacing configuration u. The center of subcarrier 0 of CRB 0 for the subcarrier spacing configuration u is equal to 'Point A' which serves as a common reference point for RB grids. The PRBs for subcarrier spacing configuration u are defined within a bandwidth part (BWP) and numbered from 0 to $N^{size,u}_{BWP,i}-1$, where i is a number of the BWP. The relation between a PRB $n_{PRB}$ in a BWP i and a CRB $n^u_{CRB}$ is given by: $n^u_{PRB} = n^u_{CRB} + N^{size,u}_{BWP,i}$, where $N^{size}_{BWP,i}$ is a CRB in which the BWP starts relative to CRB 0. The BWP includes a plurality of consecutive RBs in the frequency domain. For example, the BWP is a subset of contiguous CRBs defined for given neurology $u_i$ in BWP i on a given carrier. A carrier may include a maximum of N (e.g., 5) BWPs. The UE may be configured to have one or more BWPs on a given component carrier. Data communication is performed through an activated BWP and only a predetermined number of BWPs (e.g., one BWP) among BWPs configured for the UE may be active on the component carrier.

For each serving cell in the set of DL BWPs or UL BWPs, the network configures at least an initial DL BWP and one (when the serving cell is configured with uplink) or two (when supplementary uplink is used) initial UL BWPs. The network may configure additional UL and DL BWPs for the serving cell. For each DL BWP or UL BWP, the UE is provided with the following parameters for the serving cell: $O_{carrier}$ provided by an RRC parameter offsetToCarrier for CRB $N^{start}_{BWP} = O_{carrier} + RB_{start}$, the number of contiguous RBs $N^{size}_{BWP} = L_{RB}$, and subcarrier spacing, provided by an RRC parameter locationAndBandwidth indicating offset $RB_{set}$ and length $L_{RB}$ as resource indicator values (RIVs) based on i) subcarrier spacing; ii) cyclic prefix; iii) the assumption that $N^{start}_{BWP} = 275$; an index in the set of the DL BWPs or UL BWPs; a set of BWP-common parameters and a set of BWP-only parameters.

Virtual resource blocks (VRBs) are defined in a BWP and are numbered from 0 to $N^{size,u}_{BWP,i}-1$, where i is the number of the BWP. The VRBs are mapped to physical resource blocks (PRBs) according to non-interleaved mapping. In some implementations, in non-interleaved VRB-to-PRB mapping, VRB n may be mapped to PRB n.

The UE for which carrier aggregation is configured may be configured to use one or more cells. If the UE is configured with a plurality of serving cells, the UE may be configured with one or multiple cell groups. The UE may also be configured with a plurality of cell groups associated with different BSs. Alternatively, the UE may be configured with a plurality of cell groups associated with a single BS. Each cell group of the UE includes one or more serving cells and includes a single PUCCH cell for which PUCCH resources are configured. The PUCCH cell may be a Pcell or an Scell configured as the PUCCH cell among Scells of a corresponding cell group. Each serving cell of the UE belongs to one of cell groups of the UE and does not belong to a plurality of cells.

Figure 6:
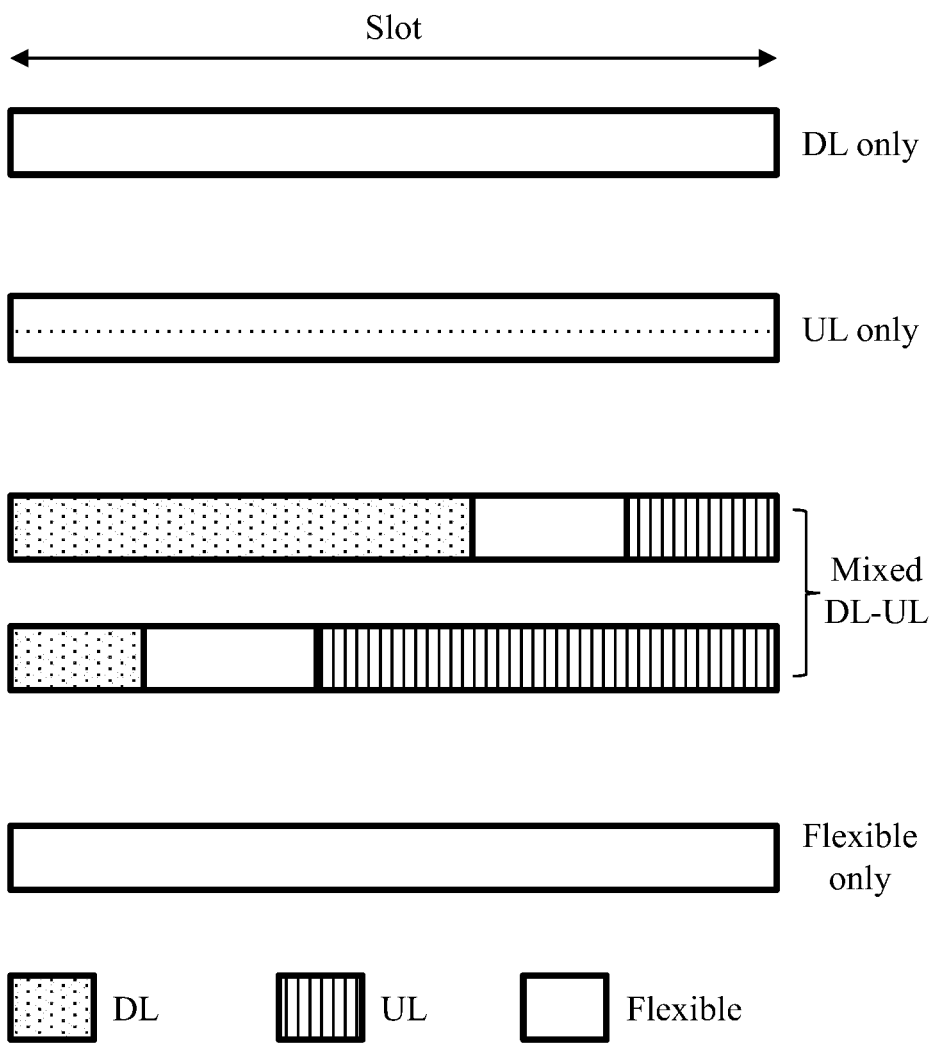
FIG. 6 illustrates slot structures used in a 3GPP-based system.
Figure 7:
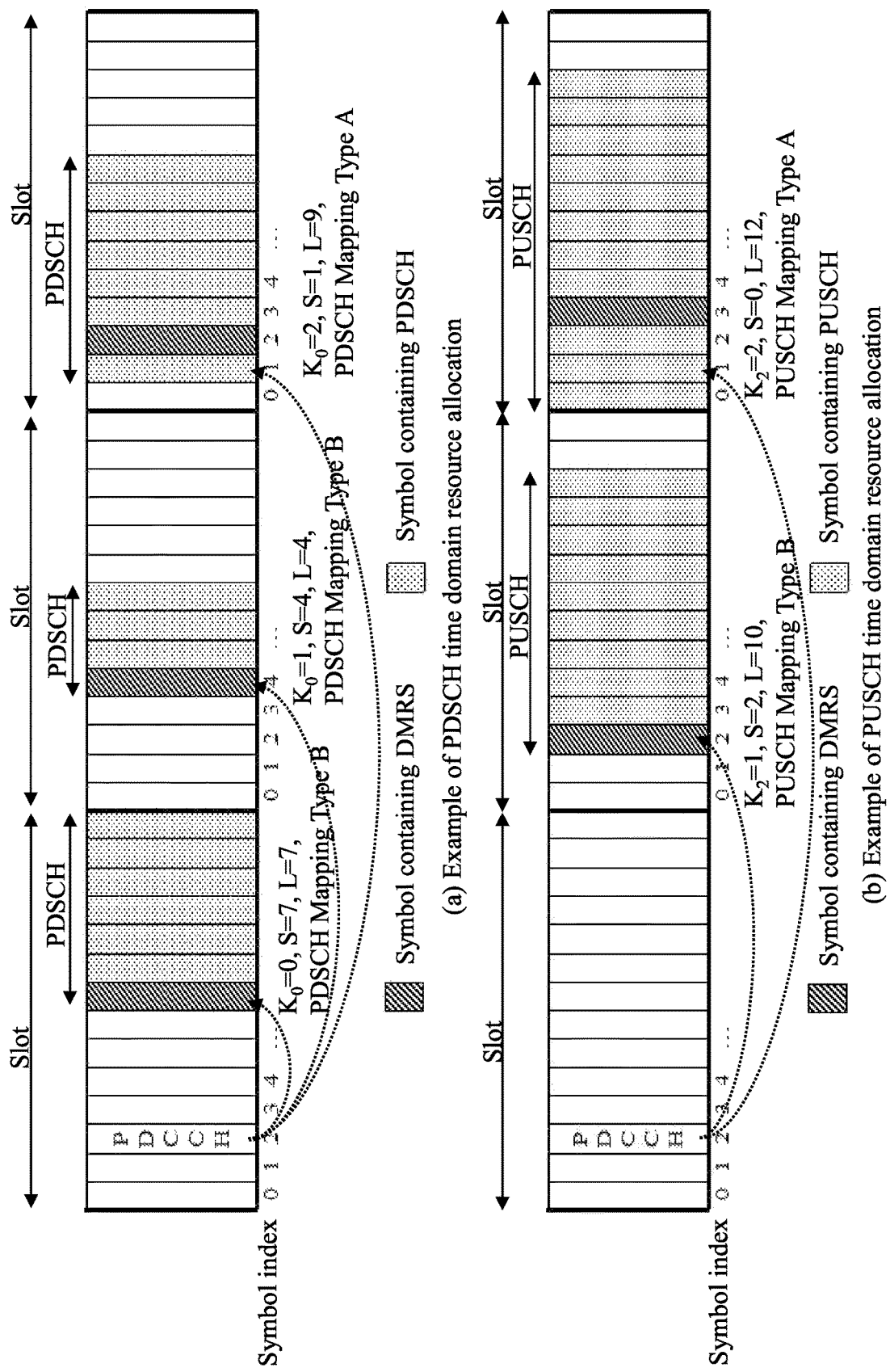
FIG. 7 illustrates an example of PDSCH time domain resource allocation (TDRA) caused by a PDCCH and an example of PUSCH TDRA caused by the PDCCH.

FIG. 6 illustrates slot structures used in a 3GPP-based system. In all 3GPP-based systems, for example, in an NR system, each slot may have a self-contained structure including i) a DL control channel, ii) DL or UL data, and/or iii) a UL control channel. For example, the first N symbols in a slot may be used to transmit the DL control channel (hereinafter, DL control region) and the last M symbols in a slot may be used to transmit the UL control channel (hereinafter, UL control region), where N and M are integers other than negative numbers. A resource region (hereinafter, data region) between the DL control region and the UL control region may be used to transmit DL data or UL data. Symbols in a single slot may be divided into group(s) of consecutive symbols that may be used as DL symbols, UL symbols, or flexible symbols. Hereinbelow, information indicating how each symbol in slot(s) is used will be referred to as a slot format. For example, which symbols in slot(s) are used for UL and which symbols in slot(s) are used for DL may be defined by a slot format.

When a BS intends to operate a serving cell in time division duplex (TDD) mode, the BS may configure a pattern for UL and DL allocation for the serving cell through higher layer (e.g., RRC) signaling. For example, the following parameters may be used to configure a TDD DL-UL pattern:
  dl-UL-TransmissionPeriodicity that provides a periodicity of the DL-UL pattern;
  nrofDownlinkSlots that provides the number of consecutive full DL slots at the beginning of each DL-UL pattern, where the full DL slots are slots having only DL symbols;
  nrofDownlinkSymbols that provides the number of consecutive DL symbols at the beginning of a slot immediately following the last full DL slot;
  nrofUplinkSlots that provides the number of consecutive full UL slots at the end of each DL-UL pattern, where the full UL slots are slots having only UL symbols; and
  nrofUplinkSymbols that provides the number of consecutive UL symbols in the end of a slot immediately preceding the first full UL slot.

The remaining symbols that are not configured as either DL symbols or UL symbols among symbols in the DL-UL pattern are flexible symbols.

If the UE is provided with a configuration for the TDD DL-UL pattern, i.e., a TDD UL-DL configuration (e.g., tdd-UL-DL-ConfigurationCommon, or tdd-UL-DLConfigurationDedicated), through higher layer signaling, the UE sets a slot format per slot over a number of slots based on the configuration.

For symbols, although there may be various combinations of DL symbols, UL symbols, and flexible symbols, a predetermined number of combinations may be predefined as slot formats and the predefined slot formats may be respectively identified by slot format indexes. The following table shows a part of the predefined slot formats. In the table below, D denotes a DL symbol, U denotes a UL symbol, and F denotes a flexible symbol.

TABLE 3

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| . . . | . . . | | | | | | | | | | | | | |

To indicate which slot format is used in a specific slot among the predefined slot formats, the BS may configure a set of slot format combinations applicable to a corresponding serving cell per cell with respect to a set of serving cells through higher layer (e.g., RRC) signaling and cause the UE to monitor a group-common PDCCH for slot format indicator(s) (SFI(s)) through higher layer (e.g., RRC) signaling. Hereinafter, DCI carried by the group-common PDCCH for the SFI(s) will be referred to as SFI DCI. DCI format 2_0 is used as the SFI DCI. For example, for each serving cell in a set of serving cells, the BS may provide the UE with the (start) position of a slot format combination ID (i.e., SFI-index) for a corresponding serving cell in the SFI DCI, a set of slot format combinations applicable to the serving cell, and a reference subcarrier spacing configuration for each slot format in a slot format combination indicated by an SFI-index value in the SFI DCI. One or more slot formats are configured for each slot format combination in the set of the slot format combinations and the slot format combination ID (i.e., SFI-index) is assigned to the slot format combination. For example, when the BS intends to configure the slot format combination with N slot formats, N slot format indexes among slot format indexes for the predefined slot formats (e.g., see Table 3) may be indicated for the slot format combination. In order to configure the UE to monitor the group-common PDCCH for the SFIs, the BS informs the UE of an SFI-RNTI corresponding to a radio network temporary identifier (RNTI) used for an SFI and the total length of a DCI payload scrambled with the SFI-RNTI. Upon detecting the PDCCH based on the SFI-RNTI, the UE may determine slot format(s) for the corresponding serving cell from an SFI-index for the serving cell among SFI-indexes in the DCI payload in the PDCCH.

Symbols indicated as flexible symbols by the TDD DL-UL pattern configuration may be indicated as UL symbols, DL symbols, or flexible symbols by the SFI DCI. Symbols indicated as the DL/UL symbols by the TDD DL-UL pattern configuration are not overridden as the UL/DL symbols or the flexible symbols by the SFI DCI.

If the TDD DL-UL pattern is not configured, the UE determines whether each slot is used for UL or DL and determines symbol allocation in each slot based on the SFI DCI and/or on DCI for scheduling or triggering DL or UL signal transmission (e.g., DCI format 1_0, DCI format 1_1, DCI format 1_2, DCI format 0_0, DCI format 0_1, DCI format 0_2, or DCI format 2_3).

NR frequency bands are defined as two types of frequency ranges, i.e., FR1 and FR2. FR2 is also referred to as millimeter wave (mmW). The following table shows frequency ranges within which NR may operate.

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Hereinafter, physical channels that may be used in the 3GPP-based wireless communication system will be described in detail.

A PDCCH carries DCI. For example, the PDCCH (i.e., DCI) carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/deactivation of configured scheduling (CS), etc. DCI including information about resource allocation of the DL-SCH is referred to as PDSCH scheduling DCI, and DCI including information about resource allocation of the UL-SCH is referred to as PUSCH scheduling DCI. The DCI includes a cyclic redundancy check (CRC). The CRC is masked/scrambled with various identifiers (e.g., radio network temporary identifier (RNTI)) according to an owner or usage of the PDCCH. For example, if the PDCCH is for a specific UE, the CRS is masked with a UE identifier (e.g., cell-RNTI (C-RNTI)). If the PDCCH is for a paging message, the CRC is masked with a paging RNTI (P-RNTI). If the PDCCH is for system information (e.g., system information block (SIB)), the CRC is masked with a system information RNTI (SI-RNTI). If the PDCCH is for a random access response, the CRC is masked with a random access-RNTI (RA-RNTI).

When a PDCCH on one serving cell schedules a PDSCH or a PUSCH on another serving cell, it is referred to cross-carrier scheduling. Cross-carrier scheduling with a carrier indicator field (CIF) may allow a PDCCH on a serving cell to schedule resources on another serving cell. When a PDSCH on a serving cell schedules a PDSCH or a PUSCH on the serving cell, it is referred to as self-carrier scheduling. When the cross-carrier scheduling is used in a cell, the BS may provide information about a cell scheduling the cell to the UE. For example, the BS may inform the UE whether a serving cell is scheduled by a PDCCH on another (scheduling) cell or scheduled by the serving cell. If the serving cell is scheduled by the other (scheduling) cell, the BS may inform the UE which cell signals DL assignments and UL grants for the serving cell. In the present disclosure, a cell carrying a PDCCH is referred to as a scheduling cell, and a cell where transmission of a PUSCH or a PDSCH is scheduled by DCI included in the PDCCH, that is, a cell carrying the PUSCH or PDSCH scheduled by the PDCCH is referred to as a scheduled cell.

A PDSCH is a physical layer UL channel for UL data transport. The PDSCH carries DL data (e.g., DL-SCH transport block) and is subjected to modulation such as quadrature phase shift keying (QPSK), 16 quadrature amplitude modulation (QAM), 64 QAM, 256 QAM, etc. A codeword is generated by encoding a transport block (TB). The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

A PUCCH means a physical layer UL channel for UCI transmission. The PUCCH carries UCI. The UCI includes the following information.

Scheduling request (SR): Information that is used to request a UL-SCH resource.

Hybrid automatic repeat request (HARQ)-acknowledgment (ACK): A response to a DL data packet (e.g., codeword) on the PDSCH. HARQ-ACK indicates whether the DL data packet has been successfully received by a communication device. In response to a single codeword, 1-bit HARQ-ACK may be transmitted. In response to two codewords, 2-bit HARQ-ACK may be transmitted. The HARQ-ACK response includes positive ACK (simply, ACK), negative ACK (NACK), discontinuous transmission (DTX), or NACK/DTX. Here, the term HARQ-ACK is used interchangeably with HARQ ACK/NACK, ACK/NACK, or A/N.

Channel state information (CSI): Feedback information about a DL channel. The CSI may include channel quality information (CQI), a rank indicator (RI), a precoding matrix indicator (PMI), a CSI-RS resource indicator (CSI), an SS/PBCH resource block indicator (SSBRI), and a layer indicator (LI). The CSI may be classified into CSI part 1 and CSI part 2 according to UCI type included in the CSI. For example, the CRI, RI, and/or the CQI for the first codeword may be included in CSI part 1, and LI, PMI, and/or the CQI for the second codeword may be included in CSI part 2.

In the present disclosure, for convenience, PUCCH resources configured/indicated for/to the UE by the BS for HARQ-ACK, SR, and CSI transmission are referred to as a HARQ-ACK PUCCH resource, an SR PUCCH resource, and a CSI PUCCH resource, respectively.

PUCCH formats may be defined as follows according to UCI payload sizes and/or transmission lengths (e.g., the number of symbols included in PUCCH resources). In regard to the PUCCH formats, reference may also be made to Table 5.

(0) PUCCH Format 0 (PF0 or F0)
  Supported UCI payload size: up to K bits (e.g., K=2)
  Number of OFDM symbols constituting a single PUCCH: 1 to X symbols (e.g., X=2)

Transmission structure: Only a UCI signal without a DMRS is included in PUCCH format 0. The UE transmits a UCI state by selecting and transmitting one of a plurality of sequences. For example, the UE transmits specific UCI to the BS by transmitting one of a plurality of sequences through a PUCCH, which is PUCCH format 0. The UE transmits the PUCCH, which is PUCCH format 0, in PUCCH resources for a corresponding SR configuration only upon transmitting a positive SR.

Configuration for PUCCH format 0 includes the following parameters for a corresponding PUCCH resource: an index for initial cyclic shift, the number of symbols for PUCCH transmission, and/or the first symbol for PUCCH transmission.

(1) PUCCH Format 1 (PF1 or F1)

Supported UCI payload size: up to K bits (e.g., K=2)
Number of OFDM symbols constituting a single PUCCH: Y to Z symbols (e.g., Y=4 and Z=14)
Transmission structure: The DMRS and UCI are configured/mapped in TDM in/to different OFDM symbols. In other words, the DMRS is transmitted in symbols in which modulation symbols are not transmitted and the UCI is represented as the product between a specific sequence (e.g., orthogonal cover code (OCC)) and a modulation (e.g., QPSK) symbol. Code division multiplexing (CDM) is supported between a plurality of PUCCH resources (conforming to PUCCH format 1) (within the same RB) by applying cyclic shifts (CSs)/OCCs to both the UCI and the DMRS. PUCCH format 1 carries the UCI of up to 2 bits and the modulation symbols are spread by the OCC (differently configured depending on whether frequency hopping is performed) in the time domain.
Configuration for PUCCH format 1 includes the following parameters for a corresponding PUCCH resource: an index for initial cyclic shift, the number of symbols for PUCCH transmission, the first symbol for PUCCH transmission, and/or an index for the OCC.

(2) PUCCH Format 2 (PF2 or F2)

Supported UCI payload size: more than K bits (e.g., K=2)
Number of OFDM symbols constituting a single PUCCH: 1 to X symbols (e.g., X=2)
Transmission structure: The DMRS and UCI are configured/mapped using frequency division multiplexing (FDM) within the same symbol. The UE transmits the UCI by applying only IFFT without DFT to encoded UCI bits. PUCCH format 2 carries UCI of a larger bit size than K bits and modulation symbols are subjected to FDM with the DMRS, for transmission. For example, the DMRS is located in symbol indexes #1, #4, #7, and #10 within a given RB with the density of ⅓. A pseudo noise (PN) sequence is used for a DMRS sequence. Frequency hopping may be activated for 2-symbol PUCCH format 2.
Configuration for PUCCH format 2 includes the following parameters for a corresponding PUCCH resource: the number of PRBs, the number of symbols for PUCCH transmission, and/or the first symbol for PUCCH transmission.

(3) PUCCH Format 3 (PF3 or F3)

Supported UCI payload size: more than K bits (e.g., K=2)
Number of OFDM symbols constituting a single PUCCH: Y to Z symbols (e.g., Y=4 and Z=14)
Transmission structure: The DMRS and UCI are configured/mapped in TDM for/to different OFDM symbols. The UE transmits the UCI by applying DFT to encoded UCI bits. PUCCH format 3 does not support UE multiplexing for the same time-frequency resource (e.g., same PRB).
Configuration for PUCCH format 3 includes the following parameters for a corresponding PUCCH resource: the number of PRBs, the number of symbols for PUCCH transmission, and/or the first symbol for PUCCH transmission.

(4) PUCCH Format 4 (PF4 or F4)

Supported UCI payload size: more than K bits (e.g., K=2)
Number of OFDM symbols constituting a single PUCCH: Y to Z symbols (e.g., Y=4 and Z=14)
Transmission structure: The DMRS and UCI are configured/mapped in TDM for/to different OFDM symbols. PUCCH format 4 may multiplex up to 4 UEs in the same PRB, by applying an OCC at the front end of DFT and applying a CS (or interleaved FDM (IFDM) mapping) to the DMRS. In other words, modulation symbols of the UCI are subjected to TDM with the DMRS, for transmission.
Configuration for PUCCH format 4 includes the following parameters for a corresponding PUCCH resource: the number of symbols for PUCCH transmission, length for the OCC, an index for the OCC, and the first symbol for PUCCH transmission.

The table below shows the PUCCH formats. The PUCCH formats may be divided into short PUCCH formats (formats 0 and 2) and long PUCCH formats (formats 1, 3, and 4) according to PUCCH transmission length.

TABLE 5

| PUCCH format | Length in OFDM symbols $N^{PUCCH}_{symb}$ | Number of bits | Usage | Etc. |
| --- | --- | --- | --- | --- |
| 0 | 1-2 | =<2 | HARQ, SR | Sequence selection |
| 1 | 4-14 | =<2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM(no UE multiplexing) |
| 4 | 4-14 | >2 | HARQ, CSI, [SR] | DFT-s-OFDM(Pre DFT OCC) |

A PUCCH resource may be determined according to a UCI type (e.g., A/N, SR, or CSI). A PUCCH resource used for UCI transmission may be determined based on a UCI (payload) size. For example, the BS may configure a plurality of PUCCH resource sets for the UE, and the UE may select a specific PUCCH resource set corresponding to a specific range according to the range of the UCI (payload) size (e.g., numbers of UCI bits). For example, the UE may select one of the following PUCCH resource sets according to the number of UCI bits, $N_{UCI}$. —PUCCH resource set #0, if the number of UCI bits=<2

PUCCH resource set #1, if 2<the number of UCI bits=<$N_1$

. . . .

PUCCH resource set #(K−1), if $N_{K-2}$<the number of UCI bits=<$N_{K-1}$

Here, K represents the number of PUCCH resource sets (K>1) and $N_i$ represents a maximum number of UCI bits supported by PUCCH resource set #i. For example, PUCCH resource set #1 may include resources of PUCCH formats 0 to 1, and the other PUCCH resource sets may include resources of PUCCH formats 2 to 4 (see Table 5).

Configuration for each PUCCH resource includes a PUCCH resource index, a start PRB index, and configuration for one of PUCCH format 0 to PUCCH format 4. The UE is configured with a code rate for multiplexing HARQ-ACK, SR, and CSI report(s) within PUCCH transmission using PUCCH format 2, PUCCH format 3, or PUCCH format 4, by the BS through a higher layer parameter maxCodeRate. The higher layer parameter maxCodeRate is used to determine how to feed back the UCI on PUCCH resources for PUCCH format 2, 3, or 4.

If the UCI type is SR and CSI, a PUCCH resource to be used for UCI transmission in a PUCCH resource set may be configured for the UE through higher layer signaling (e.g., RRC signaling). If the UCI type is HARQ-ACK for a semi-persistent scheduling (SPS) PDSCH, the PUCCH resource to be used for UCI transmission in the PUCCH resource set may be configured for the UE through higher layer signaling (e.g., RRC signaling). On the other hand, if the UCI type is HARQ-ACK for a PDSCH scheduled by DCI, the PUCCH resource to be used for UCI transmission in the PUCCH resource set may be scheduled by the DCI.

In the case of DCI-based PUCCH resource scheduling, the BS may transmit the DCI to the UE on a PDCCH and indicate a PUCCH resource to be used for UCI transmission in a specific PUCCH resource set by an ACK/NACK resource indicator (ARI) in the DCI. The ARI may be used to indicate a PUCCH resource for ACK/NACK transmission and also be referred to as a PUCCH resource indicator (PRI). Here, the DCI may be used for PDSCH scheduling and the UCI may include HARQ-ACK for a PDSCH. The BS may configure a PUCCH resource set including a larger number of PUCCH resources than states representable by the ARI by (UE-specific) higher layer (e.g., RRC) signaling for the UE. The ARI may indicate a PUCCH resource subset of the PUCCH resource set and which PUCCH resource in the indicated PUCCH resource subset is to be used may be determined according to an implicit rule based on transmission resource information about the PDCCH (e.g., the starting CCE index of the PDCCH).

For UL-SCH data transmission, the UE should include UL resources available for the UE and, for DL-SCH data reception, the UE should include DL resources available for the UE. The UL resources and the DL resources are assigned to the UE by the BS through resource allocation. Resource allocation may include time domain resource allocation (TDRA) and frequency domain resource allocation (FDRA). In the present disclosure, UL resource allocation is also referred to as a UL grant and DL resource allocation is referred to as DL assignment. The UL grant is dynamically received by the UE on the PDCCH or in RAR or semi-persistently configured for the UE by the BS through RRC signaling. DL assignment is dynamically received by the UE on the PDCCH or semi-persistently configured for the UE by the BS through RRC signaling.

On UL, the BS may dynamically allocate UL resources to the UE through PDCCH(s) addressed to a cell radio network temporary Identifier (C-RNTI). The UE monitors the PDCCH(s) in order to discover possible UL grant(s) for UL transmission. The BS may allocate the UL resources using a configured grant to the UE. Two types of configured grants, Type 1 and Type 2, may be used. In Type 1, the BS directly provides the configured UL grant (including periodicity) through RRC signaling. In Type 2, the BS may configure a periodicity of an RRC-configured UL grant through RRC signaling and signal, activate, or deactivate the configured UL grant through the PDCCH addressed to a configured scheduling RNTI (CS-RNTI). For example, in Type 2, the PDCCH addressed to the CS-RNTI indicates that the corresponding UL grant may be implicitly reused according to the configured periodicity through RRC signaling until deactivation.

On DL, the BS may dynamically allocate DL resources to the UE through PDCCH(s) addressed to the C-RNTI. The UE monitors the PDCCH(s) in order to discover possible DL grant(s). The BS may allocate the DL resources to the UE using SPS. The BS may configure a periodicity of configured DL assignment through RRC signaling and signal, activate, or deactivate the configured DL assignment through the PDCCH addressed to the CS-RNTI. For example, the PDCCH addressed to the CS-RNTI indicates that the corresponding DL assignment may be implicitly reused according to the configured periodicity through RRC signaling until deactivation.

Hereinafter, resource allocation by the PDCCH and resource allocation by RRC will be described in more detail.
Resource Allocation by PDCCH: Dynamic Grant/Assignment The PDCCH may be used to schedule DL transmission on the PDSCH and UL transmission on the PUSCH. DCI on the PDCCH for scheduling DL transmission may include DL resource assignment that at least includes a modulation and coding format (e.g., modulation and coding scheme (MCS)) index $I_{MCS}$, resource allocation, and HARQ information, associated with a DL-SCH. DCI on the PDCCH for scheduling UL transmission may include a UL scheduling grant that at least includes a modulation and coding format, resource allocation, and HARQ information, associated with a UL-SCH. The size and usage of the DCI carried by one PDCCH differs according to a DCI format. For example, DCI format 0_0, DCI format 0_1, or DCI format 0_2 may be used to schedule the PUSCH, and DCI format 1_0, DCI format 1_1, or DCI format 1_2 may be used to schedule the PDSCH. Particularly, DCI format 0_2 and DCI format 1_2 may be used to schedule transmission having higher transmission reliability and lower latency requirements than transmission reliability and latency requirement guaranteed by DCI format 0_0, DCI format 0_1, DCI format 1_0, or DCI format 1_1. Some implementations of the present disclosure may be applied to UL data transmission based on DCL format 0_2. Some implementations of the present disclosure may be applied to DL data reception based on DCI format 1_2.

FIG. 6 illustrates an example of PDSCH TDRA caused by a PDCCH and an example of PUSCH TDRA caused by the PDCCH.

DCI carried by the PDCCH in order to schedule a PDSCH or a PUSCH includes a TDRA field. The TDRA field provides a value m for a row index m+1 to an allocation table for the PDSCH or the PUSCH. Predefined default PDSCH time domain allocation is applied as the allocation table for the PDSCH or a PDSCH TDRA table that the BS configures through RRC signaled pdsch-TimeDomainAllocationList is applied as the allocation table for the PDSCH. Predefined default PUSCH time domain allocation is applied as the allocation table for the PUSCH or a PUSCH TDRA table that the BS configures through RRC signaled pusch-TimeDomainAllocationList is applied as the allocation table for the PUSCH. The PDSCH TDRA table to be applied and/or the PUSCH TDRA table to be applied may be determined according a fixed/predefined rule (e.g., refer to 3GPP TS 38.214).

In PDSCH time domain resource configurations, each indexed row defines a DL assignment-to-PDSCH slot offset $K_0$, a start and length indicator value SLIV (or directly, a start position (e.g., start symbol index S) and an allocation length (e.g., the number of symbols, L) of the PDSCH in a slot), and a PDSCH mapping type. In PUSCH time domain resource configurations, each indexed row defines a UL grant-to-PUSCH slot offset $K_2$, a start position (e.g., start symbol index S) and an allocation length (e.g., the number of symbols, L) of the PUSCH in a slot, and a PUSCH mapping type. $K_0$ for the PDSCH and $K_2$ for the PUSCH indicate the difference between the slot with the PDCCH and the slot with the PDSCH or PUSCH corresponding to the PDCCH. SLIV denotes a joint indicator of the start symbol S relative to the start of the slot with the PDSCH or PUSCH and the number of consecutive symbols, L, counting from the symbol S. The PDSCH/PUSCH mapping type has two mapping types: mapping type A and mapping type B. In PDSCH/PUSCH mapping type A, a demodulation reference signal (DMRS) is mapped to a PDSCH/PUSCH resource based on the start of a slot. According to other DMRS parameters, one or two symbols among the symbols of the PDSCH/PUSCH resource may be used as DMRS symbol(s). For example, in PDSCH/PUSCH mapping type A, the DMRS is located on the third symbol (symbol #2) or the fourth symbol (symbol #3) in the slot according to RRC signaling. In PDSCH/PUSCH mapping type B, the DMRS is mapped based on the first OFDM symbol of the PDSCH/PUSCH resource. According to other DMRS parameters, one or two symbols from the first symbol of the PDSCH/PUSCH resource may be used as DMRS symbol(s). For example, in PDSCH/PUSCH mapping type B, the DMRS is located on the first symbol allocated for PDSCH/PUSCH. In the present disclosure, the PDSCH/PUSCH mapping type may be referred to as a mapping type or a DMRS mapping type. For example, in the present disclosure, PUSCH mapping type A may be referred to as mapping type A or DMRS mapping type A, and PUSCH mapping type B may be referred to as mapping type B or DMRS mapping type B.

The scheduling DCI includes an FDRA field that provides assignment information about RBs used for the PDSCH or the PUSCH. For example, the FDRA field provides information about a cell for PDSCH or PUSCH transmission to the UE, information about a BWP for PDSCH or PUSCH transmission, and/or information about RBs for PDSCH or PUSCH transmission.

Resource Allocation by RRC

As mentioned above, there are two types of transmission without dynamic grant: configured grant Type 1 and configured grant Type 2. In configured grant Type 1, a UL grant is provided by RRC and stored as a configured UL grant. In configured grant Type 2, the UL grant is provided by the PDCCH and stored or cleared as the configured UL grant based on L1 signaling indicating configured UL grant activation or deactivation. Type 1 and Type 2 may be configured by RRC per serving cell and per BWP. Multiple configurations may be active simultaneously on different serving cells.

When configured grant Type 1 is configured, the UE may be provided with the following parameters through RRC signaling:
  cs-RNTI corresponding to a CS-RNTI for retransmission;
  periodicity corresponding to a periodicity of configured grant Type 1;
  timeDomainOffset indicating an offset of a resource with respect to system frame number (SFN)=0 in the time domain;
  timeDomainAllocation value m that provides a row index m+1 pointing to the allocation table, indicating a combination of the start symbol S, the length L, and the PUSCH mapping type;
  frequencyDomainAllocation that provides frequency domain resource allocation; and
  mcsAndTBS that provides $I_{MCS}$ indicating a modulation order, a target code rate, and a transport block size.

Upon configuration of configured grant Type 1 for a serving cell by RRC, the UE stores the UL grant provided by RRC as a configured UL grant for an indicated serving cell and initializes or re-initializes the configured UL grant to start in a symbol according to timeDomainOffset and S (derived from SLIV) and to recur with periodicity. After the UL grant is configured for configured grant Type 1, the UE may consider that the UL grant recurs in association with each symbol satisfying: [(SFN*numberOfSlotsPerFrame (numberOfSymbolsPerSlot)+(slot number in the frame*numberOfSymbolsPerSlot)+symbol number in the slot]=(timeDomainOffset*numberOfSymbolsPerSlot+S+N*periodicity) modulo (1024*numberOfSlotsPerFrame*numberOfSymbolsPerSlot), for all N>=0, where numberOfSlotsPerFrame and numberOfSymbolsPerSlot indicate the number of consecutive slots per frame and the number of consecutive OFDM symbols per slot, respectively (refer to Table 1 and Table 2).

For configured grant Type 2, the UE may be provided with the following parameters by the BS through RRC signaling:
  cs-RNTI corresponding to a CS-RNTI for activation, deactivation, and retransmission; and
  periodicity that provides a periodicity of configured grant Type 2.

An actual UL grant is provided to the UE by the PDCCH (addressed to the CS-RNTI). After the UL grant is configured for configured grant Type 2, the UE may consider that the UL grant recurs in association with each symbol satisfying: [(SFN*numberOfSlotsPerFrame* numberOfSymbolsPerSlot)+(slot number in the frame*numberOfSymbolsPerSlot)+symbol number in the slot]=[(SFN$_{start\ time}$*numberOfSlotsPerFrame* numberOfSymbolsPerSlot+slot$_{starttime}$* numberOfSymbolsPerSlot+symbol$_{start\ time}$)+N*periodicity] modulo (1024*numberOfSlotsPerFrame*numberOfSymbolsPerSlot), for all N>=0, where SFN$_{start\ time}$, slot$_{start\ time}$, and symbol$_{start\ time}$ represent an SFN, a slot, and a symbol, respectively, of the first transmission opportunity of the PUSCH after the configured grant is (re-)initialized, and numberOfSlotsPerFrame and numberOfSymbolsPerSlot indicate the number of consecutive slots per frame and the number of consecutive OFDM symbols per slot, respectively (refer to Table 1 and Table 2).

On DL, the UE may be configured with semi-persistent scheduling (SPS) per serving cell and per BWP by RRC signaling from the BS. For DL SPS, DL assignment is provided to the UE by the PDCCH and stored or cleared based on L1 signaling indicating SPS activation or deactivation. When SPS is configured, the UE may be provided with the following parameters by the BS through RRC signaling:
  cs-RNTI corresponding to a CS-RNTI for activation, deactivation, and retransmission;
  nrofHARQ-Processes that provides the number of HARQ processes for SPS;
  periodicity that provides a periodicity of configured DL assignment for SPS;

n1PUCCH-AN providing HARQ resources for PUCCH for SPS (the network configures the HARQ resources as format 0 or format 1, and the actual PUCCH-resource is configured in PUCCH-Config and referred to in n1PUCCH-AN by the ID thereof).

After DL assignment is configured for SPS, the UE may consider sequentially that N-th DL assignment occurs in a slot satisfying: (numberOfSlotsPerFrame*SFN+slot number in the frame)=[(numberOfSlotsPerFrame*$SFN_{start\ time}$+$slot_{start\ time}$) N*periodicity*numberOfSlotsPerFrame/10] modulo (1024*numberOfSlotsPerFrame), where $SFN_{start\ time}$ and $slot_{start\ time}$ represent an SFN and a slot, respectively, of first transmission of the PDSCH after configured DL assignment is (re-)initialized, and numberOfSlotsPerFrame and numberOfSymbolsPerSlot indicate the number of consecutive slots per frame and consecutive OFDM symbols per slot, respectively (refer to Table 1 and Table 2).

If the CRC of a corresponding DCI format is scrambled with the CS-RNTI provided by the RRC parameter cs-RNTI, and a new data indicator field for an enabled transport block is set to 0, the UE validates, for scheduling activation or scheduling release, a DL SPS assignment PDCCH or a configured UL grant Type 2 PDCCH. Validation of the DCI format is achieved if all fields for the DCI format are set according to Table 6 and Table 7. Table 6 shows an example of special fields for DL SPS and UL grant Type 2 scheduling activation PDCCH validation, and Table 7 shows an example of special fields for DL SPS and UL grant Type 2 scheduling release PDCCH validation.

TABLE 6

|  | DCI format 0_0/0_1 | DCI format 1_0 | DCI format 1_1 |
| --- | --- | --- | --- |
| HARQ process number | set to all '0's | set to all '0's | set to all '0's |
| Redundancy version | set to '00' | set to '00' | For the enabled transport block: set to '00' |

TABLE 7

|  | DCI format 0_0 | DCI format 1_0 |
| --- | --- | --- |
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

Actual DL assignment and UL grant for DL SPS or UL grant Type 2, and a corresponding MCS are provided by resource assignment fields (e.g., a TDRA field providing a TDRA value m, an FDRA field providing frequency resource block assignment, and/or an MCS field) in the DCI format carried by a corresponding DL SPS or UL grant Type 2 scheduling activation PDCCH. If validation is achieved, the UE considers information in the DCI format as valid activation or valid release of DL SPS or configured UL grant Type 2.

Figure 8:
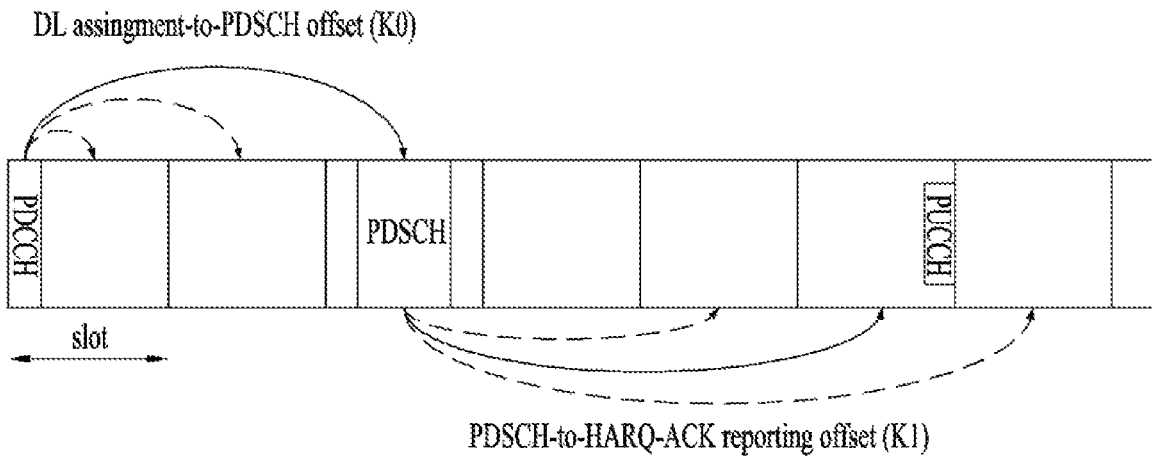
FIG. 8 illustrates a hybrid automatic repeat request-acknowledgement (HARQ-ACK) transmission/reception procedure.

FIG. 8 illustrates a HARQ-ACK transmission/reception procedure.

Referring to FIG. 8, the UE may detect a PDCCH in a slot n. Next, the UE may receive a PDSCH in a slot n+K0 according to scheduling information received through the PDCCH in the slot n and then transmit UCI through a PUCCH in a slot n+K1. In this case, the UCI includes a HARQ-ACK response for the PDSCH.

The DCI (e.g., DCI format 1_0 or DCI format 1_1) carried by the PDCCH for scheduling the PDSCH may include the following information.

FDRA: FDRA indicates an RB set allocated to the PDSCH.

TDRA: TDRA indicates a DL assignment-to-PDSCH slot offset K0, the start position (e.g., symbol index S) and length (e.g., the number of symbols, L) of the PDSCH in a slot, and the PDSCH mapping type. PDSCH mapping Type A or PDSCH mapping Type B may be indicated by TDRA. For PDSCH mapping Type A, the DMRS is located in the third symbol (symbol #2) or fourth symbol (symbol #3) in a slot. For PDSCH mapping Type B, the DMRS is allocated in the first symbol allocated for the PDSCH.

PDSCH-to-HARQ_feedback timing indicator: This indicator indicates K1.

If the PDSCH is configured to transmit a maximum of one TB, a HARQ-ACK response may consist of one bit. If the PDSCH is configured to transmit a maximum of 2 TBs, the HARQ-ACK response may consist of 2 bits when spatial bundling is not configured and one bit when spatial bundling is configured. When a HARQ-ACK transmission timing for a plurality of PDSCHs is designated as slot n+K1, UCI transmitted in slot n+K1 includes a HARQ-ACK response for the plural PDSCHs.

In the present disclosure, a HARQ-ACK payload consisting of HARQ-ACK bit(s) for one or plural PDSCHs may be referred to as a HARQ-ACK codebook. The HARQ-ACK codebook may be categorized as a semi-static HARQ-ACK codebook and a dynamic HARQ-ACK codebook according to a HARQ-ACK payload determination scheme.

In the case of the semi-static HARQ-ACK codebook, parameters related to a HARQ-ACK payload size that the UE is to report are semi-statically determined by a (UE-specific) higher layer (e.g., RRC) signal. The HARQ-ACK payload size of the semi-static HARQ-ACK codebook, e.g., the (maximum) HARQ-ACK payload (size) transmitted through one PUCCH in one slot, may be determined based on the number of HARQ-ACK bits corresponding to a combination (hereinafter, bundling window) of all DL carriers (i.e., DL serving cells) configured for the UE and all DL scheduling slots (or PDSCH transmission slots or PDCCH monitoring slots) for which the HARQ-ACK transmission timing may be indicated. That is, in a semi-static HARQ-ACK codebook scheme, the size of the HARQ-ACK codebook is fixed (to a maximum value) regardless of the number of actually scheduled DL data. For example, DL grant DCI (PDCCH) includes PDSCH-to-HARQ-ACK timing information, and the PDSCH-to-HARQ-ACK timing information may have one (e.g., k) of a plurality of values. For example, when the PDSCH is received in slot #m and the PDSCH-to-HARQ-ACK timing information in the DL grant DCI (PDCCH) for scheduling the PDSCH indicates k, the HARQ-ACK information for the PDSCH may be transmitted in slot #(m+k). As an example, k∈{1, 2, 3, 4, 5, 6, 7, 8}. When the HARQ-ACK information is transmitted in slot #n, the HARQ-ACK information may include possible maximum HARQ-ACK based on the bundling window. That is, HARQ-ACK information of slot #n may include HARQ-ACK corresponding to slot #(n-k). For example, when k∈{1, 2, 3, 4, 5, 6, 7, 8}, the HARQ-ACK information of slot #n may include HARQ-ACK corresponding to slot #(n-8) to slot #(n-1) regardless of actual DL data reception (i.e., HARQ-ACK of a maximum number). Here, the HARQ-ACK information may be replaced with a HARQ-ACK codebook or a HARQ-ACK payload. A slot may be understood/replaced as/with a candidate occasion for DL data reception. As described in the example, the bundling window may be determined based on the PDSCH-to-HARQ-ACK timing based on a HARQ-ACK slot, and a PDSCH-to-HARQ-ACK timing set may have predefined values (e.g., {1, 2, 3, 4, 5, 6, 7, 8}) or may be configured by higher layer (RRC) signaling. In the case of the dynamic HARQ-ACK codebook, the HARQ-ACK payload size that the UE is to report may be dynamically changed by the DCI etc. In the dynamic HARQ-ACK codebook scheme, DL scheduling DCI may include a counter-DAI (i.e., c-DAI) and/or a total-DAI (i.e., t-DAI). Here, the DAI indicates a downlink assignment index and is used for the BS to inform the UE of transmitted or scheduled PDSCH(s) for which HARQ-ACK(s) are to be included in one HARQ-ACK transmission. Particularly, the c-DAI is an index indicating order between PDCCHs carrying DL scheduling DCI (hereinafter, DL scheduling PDCCHs), and t-DAI is an index indicating the total number of DL scheduling PDCCHs up to a current slot in which a PDCCH with the t-DAI is present.

In the NR system, a method of implementing a plurality of logical networks in a single physical network is considered. The logical networks need to support services with various requirements (e.g., eMBB, mMTC, URLLC, etc.). Accordingly, a physical layer of NR is designed to support a flexible transmission structure in consideration of the various service requirements. As an example, the physical layer of NR may change, if necessary, an OFDM symbol length (OFDM symbol duration) and a subcarrier spacing (SCS) (hereinafter, OFDM numerology). Transmission resources of physical channels may also be changed in a predetermined range (in units of symbols). For example, in NR, a PUCCH (resource) and a PUSCH (resource) may be configured to flexibly have a transmission length/transmission start timing within a predetermined range.

A PDCCH is transmitted through a control resource set (CORESET). One or more CORESETs may be configured for the UE. The CORESET consists of a set of PRBs with a duration of 1 to 3 OFDM symbols. The PRBs and a CORESET duration that constitute the CORESET may be provided to the UE through higher layer (e.g., RRC) signaling. A set of PDCCH candidates in the configured CORESET(s) is monitored according to corresponding search space sets. In the present disclosure, monitoring implies decoding (called blind decoding) each PDCCH candidate according to monitored DCI formats. A master information block (MIB) on a PBCH provides parameters (e.g., CORESET #0 configuration) for monitoring a PDCCH for scheduling a PDSCH carrying system information block 1 (SIB1) to the UE. The PBCH may also indicate that there is no associated SIB1. In this case, the UE may be provided with not only a frequency range in which the UE may assume that there is no SSB associated with SSB1 but also other frequencies to search for an SSB associated with SIB1. CORESET #0, which is a CORESET for scheduling SIB1 at least, may be configured by the MIB or dedicated RRC signaling.

A set of PDCCH candidates monitored by the UE is defined in terms of PDCCH search space sets. The search space set may be a common search space (CSS) set or a UE-specific search space (USS) set. Each CORESET configuration is associated with one or more search space sets, and each search space set is associated with one CORESET configuration. The search space set is determined based on the following parameters provided by the BS to the UE.
controlResourceSetId: an identifier for identifying a CORESET p associated with a search space set s.
monitoringSlotPeriodicityAndOffset: a PDCCH monitoring periodicity of slots $k_s$ and a PDCCH monitoring offset of $o_s$ slots to configure slots for PDCCH monitoring.
duration: a duration of $T_s < k_s$ slots indicating a number of slots in which the search space set s exists.
monitoringSymbolsWithinSlot: a PDCCH monitoring pattern within a slot, indicating first symbol(s) of the CORESET within a slot for PDCCH monitoring.
nrofCandidates: a number of PDCCH candidates per CCE aggregation level.
searchSpaceType: an indication that search space set s is either a CCE set or a USS set.

The parameter monitoringSymbolsWithinSlot may indicate the first symbol(s) for PDCCH monitoring in the slots configured for PDCCH monitoring (e.g., see monitoringSlotPeriodicityAndOffset and duration). For example, when monitoringSymbolsWithinSlot is a 14-bit parameter, the most significant (leftmost) bit may represent the first OFDM symbol in the slot, and the second most significant (leftmost) bit may represent the second OFDM symbol in the slot. In this way, the bits of monitoringSymbolsWithinSlot may represent the 14 OFDM symbols of the slot, respectively. For example, bit(s) set to 1 among the bits in monitoringSymbolsWithinSlot may identify the first symbol(s) of the CORESET in the slot.

A UE monitors PDCCH candidates in PDCCH monitoring occasions only. The UE determines a monitoring occasion on an active DL BWP from the PDCCH monitoring periodicity, the PDCCH monitoring offset, and the PDCCH monitoring pattern within a slot. In some implementations, for search space set s, the UE determines that a PDCCH monitoring occasion(s) existing in a slot with number $n^u_{s,f}$ in a frame with number $n_f$ if $(n_f \ast N^{frame,u}_{slot} + n^u_{s,f} - o_s) \bmod k_s = 0$. The UE monitors PDCCH candidates for search space set s for $T_s$ consecutive slots, starting from slot $n^u_{s,f}$ and does not monitor PDCCH candidates for search space set s for the next $k_s - T_s$.

The following table lists DCI formats that may be carried by a PDCCH.

TABLE 8

| DCI format | Usage |
| --- | --- |
| 0_0 | Scheduling of PUSCH in one cell |
| 0_1 | Scheduling of PUSCH in one cell |
| 1_0 | Scheduling of PUSCH in one cell |
| 1_1 | Scheduling of PUSCH in one cell |
| 2_0 | Notifying a group of UEs of the slot format |
| 2_1 | Notifying a group of UEs of the PRB(s) and OFDM symbols(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group UEs of PRB(s) and OFDM symbol(s) where UE cancels the corresponding UL transmission from the UE |

DCI format 0_0 may be used to schedule a transport block (TB)-based (or TB-level) PUSCH, and DCI format 0_1 may be used to schedule the TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule the TB-based (or TB-level) PDSCH or a CBG-based (or CBG-level) PDSCH. In the case of a CSS, DCI format 0_0 and DCI format 1_0 have a fixed size after a BWP size is initially given by RRC. In the case of a USS, in DCI format 0_0 and DCI format 1_0, the size of fields except for the size of a frequency domain resource assignment (FDRA) field is fixed, whereas the size of the FDRA field may be changed through a related parameter configuration by the BS. In DCI format 0_1 and DCI format 1_1, the size of a DCI field may be changed through various RRC reconfigurations by the BS. DCI format 2_0 may be used to transfer dynamic slot format information (e.g., slot format indicator (SFI) DCI) to the UE, and DCI format 2_1 may be used to transfer DL preemption information to the UE. DCI format 2_4 may be used to indicate a UL resource on which the UE should cancel UL transmission.

Figure 9:
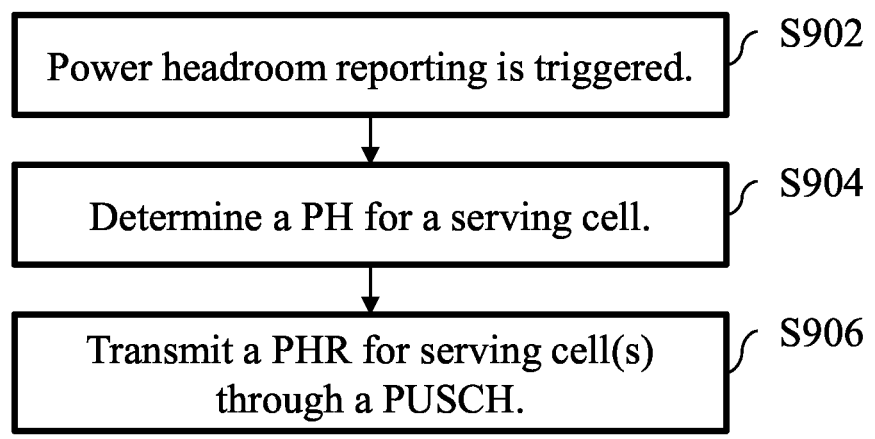
FIG. 9 illustrates a power headroom reporting procedure.

FIG. 9 illustrates a power headroom reporting procedure.

The power headroom reporting procedure may be used by the UE to provide the following information to the serving BS:

Type 1 power headroom: the difference between the nominal UE maximum transmission power and estimated power for UL-SCH transmission for each activated serving cell;

Type 2 power headroom: the difference between the nominal UE maximum transmission power and estimated power for UL-SCH and PUCCH transmissions on SpCell of other MAC entities;

Type 3 power headroom: the difference between the nominal UE maximum transmission power and estimated power for SPR transmission for each activated serving cell.

The power headroom reporting procedure may be triggered based on various events (S902). Thereafter, the UE may determine/calculate the PH for each (activated) serving cell (S904) and transmit a power headroom report/reporting (PHR) for the (activated) serving cell(s) on the PUSCH (S906).

Figures 10, 11:
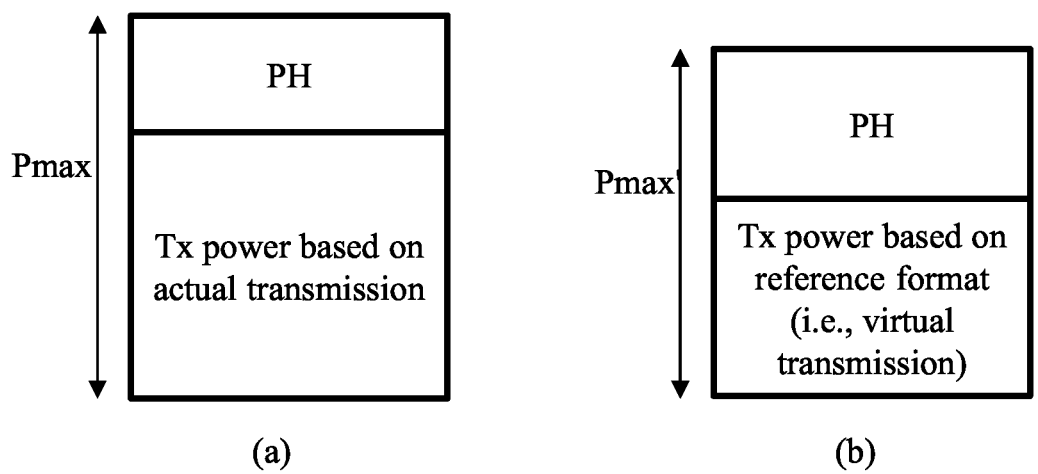
FIG. 10 illustrates a multi-entry power headroom report (PHR) medium access control (MAC) control element (CE)
FIG. 11 illustrates a method of determining a power headroom (PH) value.

FIG. 10 illustrates a multi-entry PHR MAC control element (CE). The PH for the activated (serving) cell may be transmitted through the PHR MAC CE.

Referring to FIG. 10, the PHR MAC CE may have a variable size, and may include (1) a bitmap, (2) a Type 2 PH field/$P_{CMAX,f,c}$ field for an SpCell of another MAC entity (in reporting), and (3) a Type 1 PH field/$P_{CMAX,f,c}$ field (in reporting). Whether the Type 2 PH field is included may be configured by an upper layer (e.g., RRC). The PHR MAC CE may include one or more Type X PH fields/$P_{CMAX,f,c}$ fields (in reporting) for the activated SCell. X is 1 or 3. The PH fields for the activated SCell are included in ascending order based on the serving cell index (ServCellIndex). Each field of the PHR MAC CE is defined as follows.

$C_i$ indicates the presence of a PH field for a serving cell with ServCellIndex i. The $C_i$ field set to "1" indicates the presence of a PH field for a serving cell having ServCellIndex #i. The $C_i$ field set to "0" indicates the absence of a PH field for the serving cell having ServCellIndex #i. When the highest serving cell index of the serving cells for which UL is configured is less than 8, a 1-octet bitmap is used. When the highest serving cell index is greater than or equal to 8, a 4-octet bitmap is used.

R is a reserved bit, and is set to "0."

V indicates whether the PH value is based on actual transmission or reference format. The reference format refers to a virtual transmission/format predefined for PH calculation on the assumption that there is no actual transmission. For Type 1 PH, V=0 indicates actual transmission on PUSCH, and V=1 indicates that a PUSCH reference format is used. For Type 2 PH, V=0 indicates actual transmission on PUCCH, and V=1 indicates that the PUCCH reference format is used. For Type 3 PH, V=0 indicates actual transmission in SRS, and V=1 indicates that an SRS reference format is used. Also, for Type 1 PH to Type 3 PH, V=0 indicates the presence of an associated $P_{CMAX,f,c}$ field, and V=1 indicates the absence of the associated $P_{CMAX,f,c}$ field. PH indicates the PH level.

P indicates whether power back-off is applied.

$P_{CMAX,f,c}$: indicates $P_{CMAX,f,c}$ used in calculating a preceding PH field. It represents the nominal UE maximum transmission power of the carrier f of the serving cell c.

FIG. 11 illustrates a method of determining a power headroom (PH) value. The PH for an activated (serving) cell may be determined based on an actual transmission or a reference format. For example, for PUSCH transmission occasion i in the active UL BWP b of the carrier f of the serving cell c, the UE may determine Type 1 PH as follows.

PHtype1=$P$max−$P$pusch, when PH is based on the actual transmission (FIG. 11(a));

PHtype1=$P$max'−$P$_pusch', when PH is on the reference format (FIG. 11(b)). <Equation 1>

Here, Pmax indicates the UE maximum transmission power value of the carrier f of the serving cell c in which PUSCH transmission is performed. When there is only one UL carrier in the serving cell c, f may be omitted. P_pusch indicates a power value based on the actual PUSCH transmission power. Power compensation values according to path loss may be reflected in P_pusch. Pmax' indicates the UE maximum transmission power for a reference format (or reference/virtual PUSCH transmission), and P_pusch' indicates the PUSCH transmission power for the reference format (or reference/virtual PUSCH transmission). See 3GPP TS 38.213 and 3GPP TS 38.331 for more information on how to determine P_pusch and P_pusch'.

Figure 12:
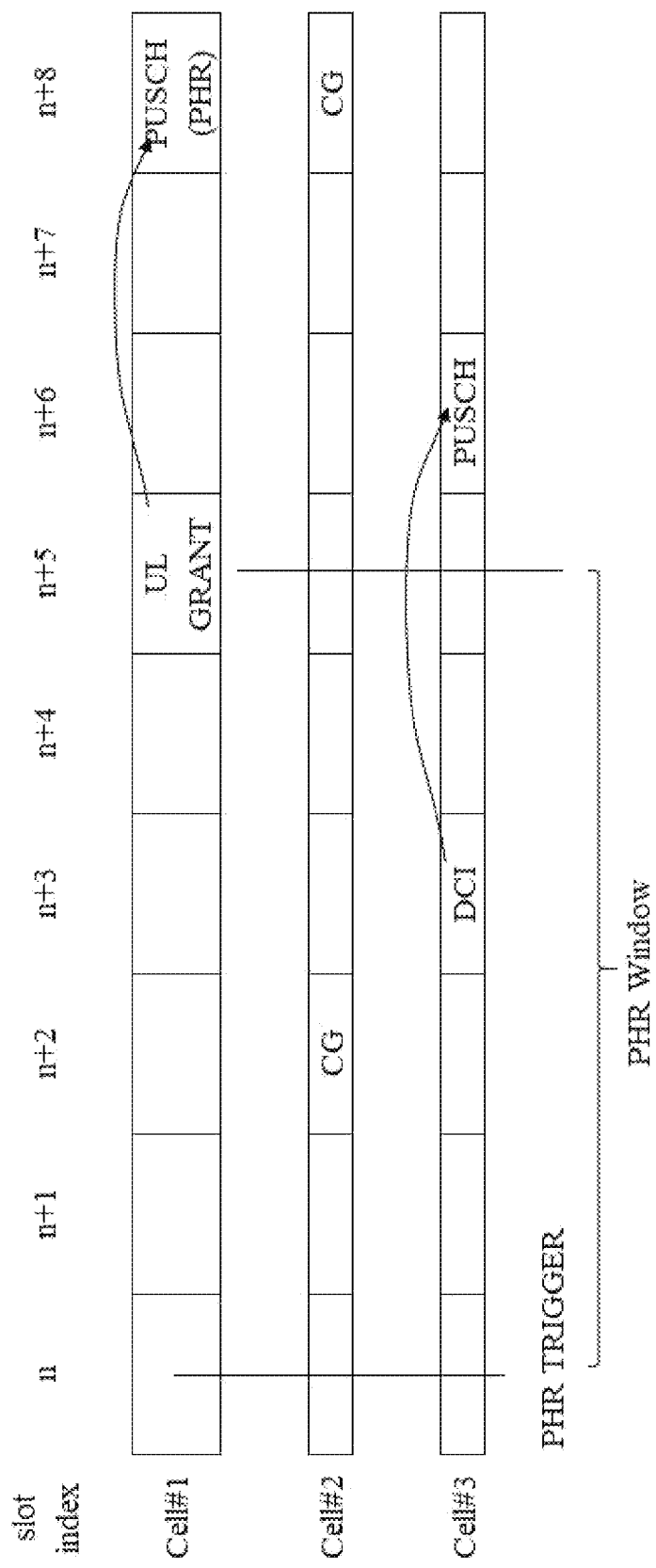
FIGS. 12 and 13 illustrate UL transmission used to calculate a PH value for a serving cell in some embodiments of the present disclosure.
Figure 13:
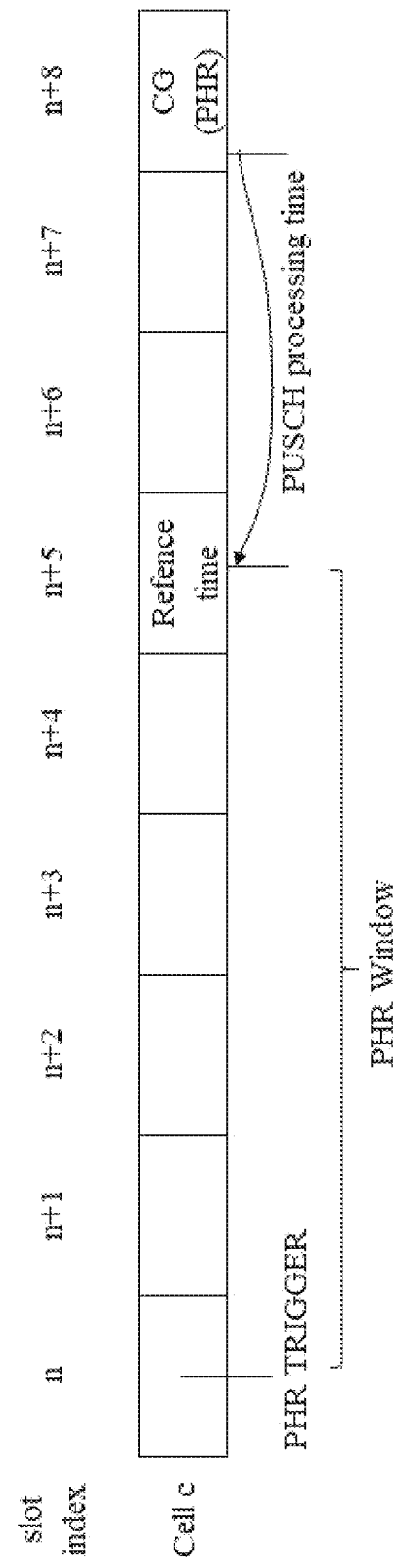

FIGS. 12 and 13 illustrate UL transmission used to calculate a PH value for a serving cell in some embodiments of the present disclosure. Hereinafter, for simplicity, a period from the time when the power headroom report is triggered to the time when the DCI triggering the PUSCH on which the PH is to be reported is received is referred to as a PHR window, and UL transmission that serves as a reference in calculating the PH value for the serving cell is referred to as reference UL transmission.

In some implementations of the present disclosure, the UE may calculate a power headroom (PH) based on a time point at which actual transmission for transmission of the PHR is scheduled since a power report headroom report was triggered to perform power headroom reporting or a processing time of the reference format. For example, referring to FIG. 12, when the PHR for an activated serving cell is reported on the PUSCH triggered by the first UL grant DCI after triggering of the PHR, the UE may determine whether the PHR is based on an actual transmission or a reference format, based on i) higher layer (RRC) signaling of configured grant (CG) and periodic/semi-persistent sounding reference signal transmissions, and ii) downlink control information received by the UE until the PDCCH monitoring occasion when the UE detects the first UL grant DCI for scheduling initial transmission of a transport block after the PHR is triggered. Referring to FIG. 13, when the PHR is reported on a PUSCH using a configured grant, the UE may determine whether the PHR is based on an actual transmission or a reference format, based on i) higher layer signaling of CG and periodic/semi-persistent sounding reference signal transmissions, and ii) downlink control information received by the UE until the first uplink symbol of a configured PUSCH transmission minus $T_{proc,2}$. In other words, the UE may calculate a PH value based on higher layer signaling and/or L1 signaling until a specific time after the PHR is triggered.

If there is an indicated/configured UL transmission in a cell at the time when a PH value for the cell is reported, the PH value may be calculated based on the indicated/configured actual UL transmission. Otherwise, the PH value may be calculated based on the reference format. For example, referring to FIG. 11, when a PH value for cell #2 and a PH value for cell #3 are included in a PHR to be transmitted on PUSCH in cell #1 in slot #n+8, the PH value for cell #2 may be calculated based on the PUSCH transmission of the configured grant in slot #n+8 because the grant configured in cell #2 is present in slot #n+8. Since there is no actual UL transmission in cell #2 in the slot #n+8, the PH value for cell #2 may be calculated based on the reference format (i.e., virtual UL transmission).

In some scenarios, a transmission or reception previously configured or indicated to the UE may be canceled or overridden by the BS for another transmission or reception. In other words, the UE or BS may process a specific transmission channel first among other transmission channels, which is referred to as channel prioritization. The channel prioritization operation may occur randomly according to a MAC layer determination according to a traffic arrival or a buffer state at the UE side as well as an explicit indication or configuration from the BS through L1 signaling and/or higher layer signaling of the BS.

In the present disclosure, a description will be given of a method or methods of performing power headroom reporting by a UE, assuming any channel prioritization when the channel prioritization occurs in order to reduce a mismatch among information in the PHR of the UE, the actual PH of the UE, and the assumption of the BS.

In some scenarios, the BS may reverse the previous scheduling indication for high priority traffic, and thus the UE may prioritize a specific channel and drop/omit the other channels, based on the priority of the traffic according to the indication from the BS. For example, since whether to use the configured grant is determined according to the uplink buffer state of the UE and the presence of a MAC PDU, a low-priority dynamic grant separately indicated by the BS may be used in preference to the high-priority configured grant according to the buffer state of the UE and the presence of the MAC PDU. However, according to this series of processes, a lot of signaling may be required to allow the UE and/or BS to determine whether a specific channel is actually transmitted, the BS may fail to accurately predict the channel prioritization determined by the UE. For example, when one or more signals causing channel prioritization are missing, or when the UE arbitrarily performs channel prioritization according to information (e.g., a buffer state) that the UE cannot share with the BS in real time, the BS may not accurately specify uplink transmission used for calculation of the PHR transmitted by the UE.

In the present disclosure, a description will be given of a method and procedure for determining reference uplink transmission to be used in PHR calculation in consideration of potential channel prioritization when a UE performs PHR transmission. For example, a method of selecting a target UL transmission for PHR calculation based on a specific priority transmission, a method of selecting a target UL transmission for PHR calculation based on a scheduling scheme, and a method of selecting a specific UL transmission among multiple configured UL transmissions as a target of the PHR calculation will be described. With the methods, the BS may more accurately predict the power headroom of the UE through PHR, and the UE may calculate the PHR regardless of channel prioritization due to occurrence of high priority traffic. Accordingly, implementation complexity of the UE may be reduced.

UE Perspective

First, implementations of the present disclosure will be described from the UE perspective. According to some implementations of the present disclosure, the UE may determine UL transmission to be used for PHR calculation for a cell and transmit the PHR.

Figure 14:
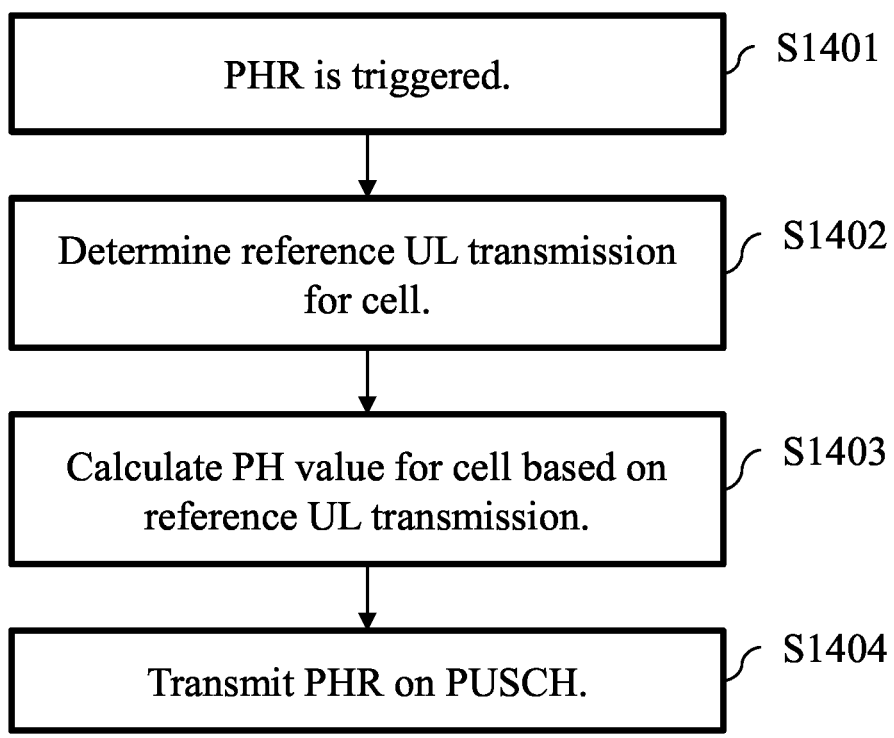
FIG. 14 illustrates a PHR transmission flow according to some embodiments of the present disclosure.

FIG. 14 illustrates a PHR transmission flow according to some embodiments of the present disclosure.

The UE may receive an RRC configuration related to the PHR, that is, RRC parameters related to the PHR from the BS. For example, the UE may receive RRC parameters included in a PHR-Config information element (IE). In addition, the UE may receive configured parameters related to PUSCH transmission (e.g., PUSCH-Config IE, ConfiguredGrantConfig IE, etc.) from the BS for the delivery of a PHR MAC control elements (CE). For example, the BS may control power headroom reporting by configuring the parameters in the following table for the UE through RRC signaling (see PHR-Config IE in 3GPP TS 38.331).

TABLE 9 multiplePHR

Indicates if power headroom shall be reported using the Single Entry PHR MAC control element or Multiple Entry PHR MAC control element defined in 3GPP TS 38.321. True means to use Multiple Entry PHR MAC control element and False means to use the Single Entry PHR MAC control element. The network configures this field to true for MR-DC and UL CA for NR, and to false in all other cases.

phr-ModeOtherCG

Indicates the mode (i.e. real or virtual) used for the PHR of the activated cells that are part of the other Cell Group (i.e. MCG or SCG), when DC is configured. If the UE is configured with only one cell group (no DC), it ignores the field.

phr-PeriodicTimer

Value in number of subframes for PHR reporting. Value sf10 corresponds to 10 subframes, value sf20 corresponds to 20 subframes, and so on.

phr-ProhibitTimer

Value in number of subframes for PHR reporting. Value sf0 corresponds to 0 subframe, value sf10 corresponds to 10 subframes, value sf20 corresponds to 20 subframes, and so on.

phr-Tx-PowerFactorChange

Value in dB for PHR reporting. Value dB1 corresponds to 1 dB, dB3 corresponds to 3 dB and so on. The same value applies for each serving cell (although the associated functionality is performed independently for each cell).

phr-Type2OtherCell

If set to true, the UE shall report a PHR type 2 for the SpCell of the other MAC entity.

An operation of the UE receiving parameters related to the PHR from the BS through RRC signaling may be implemented by the devices of FIG. 2 or 3. For example, referring to FIG. 2, the one or more processors 102 may control the one or more transceivers 106 and/or the one or more memories 104 to receive the parameters related to PHR from the BS through the RRC signaling. The one or more transceivers 106 may receive the parameters related to the PHR from the BS through the RRC signaling. In some implementations, higher layer (e.g., RRC) parameters may be received during the RRC connection setup process of the initial access procedure.

The PHR of the UE may be triggered based on the RRC configuration related to the PHR (S1401).

In some implementations of the present disclosure, the PHR may be triggered when a predefined specific event occurs. For example, the power headroom reporting procedure may be triggered when any of the following events occurs: (1) the phr-ProhibitTimer expires or has expired when a MAC entity has UL resources for a new transmission, and the pathloss has changed for at least one activated serving cell of the MAC entity more than the phr-Tx-PowerFactorChange since the last transmission of the power headroom report (PHR) within any MAC entity used as a pathloss reference; (2) the phr-PeriodicTimer expires; (3) the power headroom report functionality is configured/reconfigured by a higher layer (e.g., RRC); (4) the SCell of any MAC entity with a configured uplink is activated; (5) a PSCell is added; etc.

The operation of the UE triggering the PHR may be implemented by the devices of FIG. 2 or 3. For example, referring to FIG. 2, the one or more processors 102 may trigger a PHR depending on whether the UE is configured with a PHR-Config IE, or depending on the start/expiration operation of a timer whose length is determined by phr-PeriodicTimer or phr-ProhibitTimer, or when the pathloss is changed by more than a value set by phr-Tx-PowerFactorChange.

When the PHR is triggered, the UE may determine a reference UL transmission for PHR calculation for the cell (S1402). In some scenarios, presence of multiple candidate reference UL transmissions that may be used to calculate the PH value for one cell may be allowed due to different CG configurations and/or different priorities.

Figure 15:
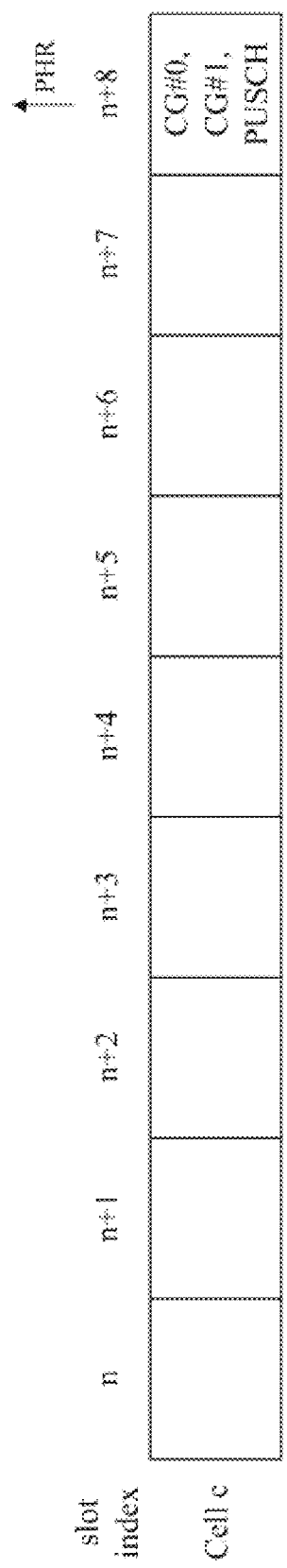
FIG. 15 illustrates a case where there is a plurality of candidate reference UL transmissions to be used for calculating a PH value for a cell.

FIG. 15 illustrates a case where a plurality of candidate reference UL transmissions is used to calculate a PH value for a cell. Referring to FIG. 15, there may be two CG PUSCHs (CG #0 and CG #2) overlapping in time and a dynamically scheduled PUSCH as candidate reference UL transmissions that may be used for a PH value for a cell. While it illustrated in FIG. 15 that two CG PUSCHs and one dynamically scheduled PUSCH are configured as candidate reference UL transmissions for calculation of a PH value for a cell, multiple PUSCH transmissions overlapping in time in a cell and having different priorities and/or according to different CG configurations, and/or a configured semi-persistent/periodic SRS transmission may also be candidate reference UL transmissions for calculation of the PH value.

In some implementations of the present disclosure, when the UE determines the reference UL transmission, the channel priority indicated/configured for each UL transmission may be considered. The operation of the UE determining the reference UL transmission may be implemented by the devices of FIG. 2 or 3. For example, referring to FIG. 2, the one or more processors 102 may consider a priority of a configured grant for the UE, a priority of PUSCH transmission scheduled through DCI format 0_0/0_1/0_2, a priority of SRS transmission indicated through DCI format 0_0/0_1/0_2 (if any), and a priority of a configured semi-persistent SRS. For example, the following methods may be considered.

The PHR is calculated based on an indicated/configured high-priority UL transmission. In other words, the PHR is calculated on the assumption that there is no indicated/configured low-priority transmission. For example, when multiple high-priority PUSCH transmissions overlap with each other, a reference UL transmission for PHR calculation may be selected in order of a PUSCH with a dynamic grant and a PUSCH with a lowest index configured grant.

The PHR is calculated based on the indicated/configured low-priority UL transmission. In other words, the PHR is calculated, assuming that there is no indicated/configured high-priority transmission.

The PHR is calculated based on the scheduling time of the PUSCH on which the PHR is transmitted. That is, after the scheduling point of the PUSCH, the PHR is calculated, assuming that there is no channel prioritization. This may be limited to a case where the PUSCH on which the PHR is transmitted is a PUSCH indicated by a dynamic grant (i.e., DCI for scheduling UL transmission) and/or a case where the PUSCH on which the PHR is transmitted is a high-priority PUSCH.

Referring to FIG. 14, the UE may calculate a PHR value for the cell based on the reference UL transmission determined for the cell (S1403).

The UE may transmit the PHR value through a PUSCH resource (S1404). For example, the UE may transmit a PHR MAC CE including the determined PHR value through a PUSCH resource.

In implementations of the present disclosure, the following UE operations may be considered.

<Implementation A1> When two or more UL transmissions that the UE may use to calculate the PHR for a cell are indicated or configured to occupy at least one symbol together (i.e., there are multiple candidate UL transmissions for PHR calculation for the cell), the UE may determine UL transmission having a specific priority among the two or more UL transmissions as a reference UL transmission for PHR calculation regardless of whether the transmission is actually performed.

According to Implementation A1, in the case where the BS cannot know whether a configured UL transmission (e.g., PUSCH with a configured grant) is performed when performing dynamic scheduling for the UE, an operation between the UE and the BS may be further clarified. For example, when a symbol T is configured to be used by a high priority (HP) configured grant (CG) PUSCH, the BS may schedule a low priority (LP) PUSCH using the symbol T through a dynamic grant (DG). In this case, the UE may selectively transmit an LP DG PUSCH or HP CG PUSCH according to the determination of the MAC layer of the UE and the buffer state. According to Implementation A1, the UE derives a PHR value based on UL transmission of a specific priority regardless of the UL transmission that is actually performed by the UE. Accordingly, the same PHR value may be derived regardless of a UL transmission performed among the two or more UL transmissions indicated/configured for the UE, and BS may expect the same.

Here, the priority may be determined for each UL transmission through L1 signaling and/or higher layer signaling of the BS. For example, the priority of a UL transmission may be determined according to a DCI format indicating the UL transmission, may be determined based on a value of a specific field included in the DCI indicating the UL transmission, or may be configured using RRC parameter(s) (e.g., ConfiguredGrantConfig IE for PUSCH of the configured grant) associated with the UL transmission.

When the priority of UL transmission can be indicated or configured in multiple levels, for example, when one of three or more priority levels can be indicated or configured, the specific priority may be the lowest or highest priority among the multiple priority levels.

In some implementations, the priority of a UL transmission may be determined according to a potential possibility of cancellation of the UL transmission. For example, a UL transmission that may be canceled by a UL cancellation indication or another dynamically scheduled UL transmission may have a lower priority than the other UL transmissions that are not canceled.

<Implementation A1-1> The priority of a UL transmission through which PHR is transmitted may be used to determine the specific priority. That is, a target UL transmission for PHR calculation may be determined based on the priority of a UL transmission through which the PHR is transmitted. For example, when the PHR is transmitted on the LP DG PUSCH in cell A, a UL transmission of a lower priority may be selected as a reference UL transmission for calculation of a PH value for cell B included in the PHR (from among candidate reference UL transmissions in cell B). This operation may match the priority of a transmission channel with the priority of transmitted information, such that lower priority information may be dropped even when channel prioritization of the UE occurs. For example, when the priority of the transmission channel is low and high priority information (e.g., PHR of HP PUSCH) is included in the transmission channel, the high priority information is dropped when the low priority transmission channel is dropped through the channel prioritization. Accordingly, in Implementation A1-1, only low priority information is always included in the low priority channel, such that only low priority information may be dropped even when the low priority channel is dropped.

<Implementation A1-2> In contrast, a PHR calculated based on a high priority UL transmission may always be sent to help accurate channel adaptation of high priority transmission. That is, a high priority UL transmission may always be used as a reference UL transmission for calculation of a PH value. This scheme may be useful when the traffic included in the high priority UL transmission is sporadic.

<Implementation A2> When two or more UL transmissions available for calculation of a PH value overlap with each other in time, the UE may fail to select one UL transmission based on priority alone. For example, when HP CG PUSCH overlaps with HP DG PUSCH, or two or more HP CG PUSCHs overlap with each other, the UE may fail to select one UL transmission based on priority alone. In this case, at least one of the following implementations may be considered.

<Implementation A2-1> When a configured UL transmission and a dynamically scheduled UL transmission that have the same priority or no priority overlap with each other (in time in the cell), the dynamically scheduled UL transmission may be selected as a target UL transmission for PHR calculation. That is, when there are a configured UL transmission and a dynamically scheduled UL transmission that have the same priority or have no configured/indicated priority as candidate reference UL transmissions for calculation of a PH value for the cell, the dynamically scheduled UL transmission may be selected as a reference UL transmission for calculation of the PH value for the cell. Referring to FIG. 15, when CG #0, CG #, and PUSCH have the same priority or have no configured/indicated priority, the UE may calculate the PH value based on the PUSCH.

In some implementations, Implementation A2-1 may be extended to include a case where the dynamically scheduled UL transmission is selected in preference to the configured UL transmission regardless of the priorities. In this case, UL transmission by explicit dynamic scheduling of the BS may be prioritized over the semi-statically/semi-persistently configured UL transmission, thereby reducing possible inconsistency between the UE and the BS in terms of reference UL transmission used for PH calculation. This operation may be performed regardless of whether the dynamically scheduled UL transmission is canceled.

<Implementation A2-2> When two or more configured UL transmissions (e.g., configured grant-based PUSCH transmission(s) and/or semi-persistent/periodic SRS transmission) having the same priority or no priority overlap with each other, one of the configured UL transmissions may be selected as a target UL transmission for PHR calculation using the following method: a UL transmission with the lowest configuration index is prioritized as the reference UL transmission for calculation of the PH value. For example, referring to FIG. 15, when CG #0 of the configuration index #0 and CG #1 of configuration index #0 have the same specific priority and the specific priority is prioritized over the priority of the scheduled PUSCH in determining UL transmission to be used for PHR calculation, the UE may calculate the PH value based on CG #0. In this case, the BS may configure a reliability-sensitive CG to have a low configuration index, such that the UE may prioritize a specific CG configuration to use it for PHR calculation. Thereby, the BS may configure a CG that is more sensitive to reliability to be used for PHR calculation.

<Implementation A2-3> When two or more UL transmissions having the same priority or having no priority overlap with each other, one UL transmission may be selected as a reference UL transmission for PHR calculation according to at least one of the following methods.

When the candidate reference UL transmissions are PUSCH transmissions, a UL transmission using the lowest modulation and coding scheme (MCS) index is selected as a target UL transmission for PHR calculation. In this case, the BS may configure a PUSCH transmission that is more reliability-sensitive to be a target for PHR calculation.

Among the candidate reference UL transmissions, a UL transmission using the highest transmission power $P_{O\_PUSCH}$ is selected as a target UL transmission for PHR calculation. For example, when a nominal power offset p0 (e.g., p0-nominal) and a PUSCH power offset (e.g., a component of P0-PUSCH-AlphaSet or P0-PUSCH-Set) are configurable for PUSCH transmission, and the value of at least one of the offsets is configurable for each UL transmission, the UL transmission using the highest transmission power may be selected as the target UL transmission for PHR calculation. In other words, UL transmission having the largest sum of the nominal power offset p0 and the PUSCH power offset may be selected as the target UL transmission for PHR calculation. Alternatively, a UL transmission having the largest power offset that may be configured for each UL transmission may be selected as the target UL transmission for PHR calculation. In other words, a UL transmission having the largest configured PUSCH power offset may be selected as the target UL transmission for PHR calculation. Alternatively, a UL transmission making the least PHR value may be selected as the target UL transmission for PHR calculation. In this case, the BS may cause the UE to derive and report the least PHR value, which is a PHR value for the worst case, such that the reported power headroom of the UE is not saturated within the report-allowed range.

A UL transmission occupying the largest resource among the candidate reference UL transmissions is selected as the target UL transmission for PHR calculation. According to this method, PHR information for the resource used by the BS to obtain the highest resource efficiency may be acquired because a UL transmission using the largest resource may obtain the highest resource efficiency.

Among the candidate reference UL transmissions, a PUSCH having a shorter UL grant-to-PUSCH timing (e.g., the value of K2 in the indicated TDRA entry) may be prioritized for PHR calculation. In this case, the BS may configure a PUSCH transmission that is more latency-sensitive to be the target for PHR calculation.

Among the candidate reference UL transmissions, a PUSCH whose transmission starts earlier may be prioritized for PHR calculation.

The UE and the BS may select one UL transmission from among multiple UL transmissions by combining some of the multiple methods proposed in Implementation A2 in order. Depending on the importance of the presented advantageous effects, a method having an effect of a higher importance may be applied first. Accordingly, the advantageous effects according to the multiple proposed methods may be obtained through Implementation A2.

<Implementation A3> The UE may apply a TDD UL-DL configuration provided by tdd-UL-DL-ConfigCommon and/or tdd-UL-DL-ConfigDedicated, and/or a slot format indicator provided by DCI format 2_0, before selecting a UL transmission for calculation of the PHR. In other words, the UE may perform the PHR calculation by selecting one of the remaining UL transmissions except for a UL transmission canceled by the TDD operation (e.g., a UL transmission including a symbol indicated as DL (or flexible) indicated by tdd-UL-DL-ConfigCommon, tdd-UL-DL-ConfigDedicated, and/or DCI format 2_0). In this case, by reflecting an actual UL transmission (or a UL transmission except for a UL transmission that is not to be performed due to the TDD operation) in the PHR calculation, the UE may be caused to report a value closer to the actual power headroom of the UE to the BS.

<Implementation A4> In selecting a UL transmission for calculation of the PHR, the UE may ignore the TDD UL-DL configuration provided by tdd-UL-DL-ConfigCommon and/or tdd-UL-DL-ConfigDedicated, and/or the slot format indicators provided by DCI format 2_0. In other words, the UE may select one of the candidate reference UL transmissions including a transmission canceled by the TDD operation to perform PHR calculation. In this case, as the TDD operation that may differ among cells is not reflected in the PHR calculation, unnecessary complexity of the PHR calculation may be reduced.

In some implementations, before selecting a UL transmission for the PHR calculation, the UE may apply the TDD UL-DL configuration provided by tdd-UL-DL-ConfigCommon and/or tdd-UL-DL-ConfigDedicated, and ignore the slot format indicator provided by DCI format 2_0. In this case, as the slot format indicator is not reflected in the PHR calculation, the ambiguity that may occur in the event of DCI loss may be reduced.

<Implementation A5> The UE may apply the information provided by the UL cancellation indication (e.g., DCI format 2_4) to select a UL transmission for calculation of the PHR. In other words, the UE may select one of the remaining UL transmissions except for a UL transmission canceled by the UL cancellation indication to perform PHR calculation. This operation may allow the UE to report a value closer to the actual power headroom of the UE by reflecting the actual transmission (or a UL transmission other than UL transmissions not to be performed due to the UL cancellation indication) in the PHR calculation.

<Implementation A6> The UE may ignore the information provided by the UL cancellation indication (e.g., DCI format 2_4) in selecting a UL transmission for calculation of the PHR. Here, DCI format 2_4 may be DCI used by the UE to notify the PRB(s) and OFDM symbol(s) for canceling a UL transmission from the UE. In other words, the UE may select one of the candidate reference UL transmissions including a UL transmission canceled by the UL cancellation indication to perform PHR calculation. In this case, the UL cancellation indication may not be considered or reflected in the PHR calculation, and accordingly the ambiguity that may occur in the event of DCI loss may be reduced.

<Implementation A7> When the PUSCH on which the MAC PDU including the PHR is to be transmitted is canceled by the MAC layer operation of the UE and/or the PHY layer operation of the UE, and thus the MAC PDU is dropped rather than being transmitted, the UE may trigger the PHR again and/or expire the phr-ProhibitTimer. Alternatively, the UE may immediately expire the phr-PeriodicTimer and phr-ProhibitTimer.

In some scenarios, when the PHR is triggered, the MAC layer of the UE may generate a MAC PDU containing a PHR value determined by the reference UL transmission, start or restart the phr-PeriodicTimer and the phr-ProhibitTimer, and cancel all triggered PHRs. That is, when a PDU including the PHR is generated, the UE skips transmitting the PHR for a while using a timer. When the transmission of the MAC PDU containing the PHR is canceled by other operations of the UE, it is difficult for the UE to resend the PHR until the phr-PeriodicTimer and/or phr-ProhibitTimer expires again. Implementation A7 may cause the UE to trigger the PHR again when the PUSCH on which the PHR is transmitted is canceled, thereby minimizing side effects caused by cancellation of the PUSCH for transmission of the PHR and allowing the PHR to be transmitted with a pre-configured periodicity.

<Implementation A8> When a virtual UL transmission with any transmission parameter(s) is used as a reference UL transmission for PHR calculation due to the absence of a scheduled/configured UL transmission to be used for PHR calculation, it may be assumed that an open-loop parameter indication field (refer to Format 0_1 and Format 0_2 of 3GPP 38.212) is not present in the scheduling information (e.g., DCI) for PUSCH, or the field may be assumed to have a specific value (e.g., 0 or 1). Alternatively, it may be assumed that P0-PUSCH-Set is not configured even when P0-PUSCH-Set is configured for the UE by BS through higher layer signaling (e.g., RRC signaling). In this case, the UE may determine the PUSCH transmission power based on the value of P0-PUSCH-AlphaSet without considering the value of P0-PUSCH-Set indicated by the open-loop parameter indication field. According to Implementation A8, when a different p0 offset parameter is allowed to be selected at each scheduling time through the open-loop parameter indication, the changed p0 offset parameter may be reflected in the PHR, or one of the values that may be reflected may be used as a fixed specific value. Thereby, ambiguity between the UE and the BS may be reduced <Implementation A9> When the PUSCH is used for PHR calculation and when the UE is allowed to use PUSCH repetition type B, the first nominal or actual repetition according to PUSCH scheduling may be used for PHR calculation. The PUSCH repetition type B may include the PUSCH repetition type B described in 3GPP TS 38.214 (see Section 6.3.2 of 3GPP TS 38.214), and may represent a method by which the UE repeats PUSCH transmission based on the given PUSCH scheduling back-to-back at the slot-level or symbol-level as many times as indicated K in the symbols except for some invalid symbol(s).

When the PHR is calculated based on the first nominal repetition of the PUSCH scheduling, the UE may calculate the PHR in the same way as when the repetition type B is not used. That is, based on the explicit scheduling information indicated or configured by the BS, the PHR may be calculated in consideration of resource elements occupied by the PUSCH. In this case, the UE may be allowed to operate consistently when different PUSCH repetition types are used in different cells. In addition, the implementation complexity of the UE may be reduced. Here, the nominal repetition may be a repetition based on the number of repetitions K included in the DCI for scheduling PUSCH transmission or the UL CG configuration. The PUSCH transmission occasion corresponding to the nominal repetition may be determined regardless of the invalid symbol that cannot be used for actual UL transmissions (e.g., a symbol indicated as DL by an RRC parameter tdd-UL-DL-ConfigurationCommon or tdd-UL-DL-ConfigurationDedicated from BS, and/or a symbol configured as an invalid symbol by a higher layer (e.g., RRC) parameter (e.g., an invalid symbol pattern) from the BS).

When the calculation is based on the first actual repetition of the PUSCH scheduling, the UE may calculate the PHR based on the resource region of the actual transmission. That is, the UE may calculate the PHR considering resource elements actually occupied by the first PUSCH instance in consideration of the invalid symbols of the PUSCH transmission as well as explicit scheduling information indicated or configured by the BS. In this case, the actual power headroom of the UE may become similar to the PHR value, and the probability that other UL transmissions unnecessarily overlap with the PUSCH occur may be reduced. Here, the actual repetition is a consecutive set of potentially valid symbols that may be used for PUSCH repetitive transmission in a slot. After the invalid symbol(s) for each of the K nominal repetitions is determined, the remaining symbols may be considered as potentially valid symbols for the PUSCH repetitive transmission. When the number of potentially valid symbols for the PUSCH repetitive transmission is greater than 0 for the nominal repetition, the nominal repetition may be composed of one or more actual transmissions. The actual transmission may be omitted according to certain conditions(s). For example, when (some or all) symbols(s) for actual transmission cannot be used for UL transmission based on DCI format 2_0, the actual transmission may be omitted.

Implementation A9 may be applied to determine whether different UL transmissions overlap with each other in using other implementations of the present disclosure. For example, in determining whether PUSCH X and PUSCH Y, each using PUSCH repetition type B, overlap with each other (in the time domain), overlapping between PUSCH X and PUSCH Y (in the time domain) may be determined in consideration of the first nominal or actual repetition of PUSCH X and PUSCH Y. Specifically, when the first nominal or actual repetition of PUSCH X and PUSCH Y occupies one or more symbols together, it may be determined that PUSCH X and PUSCH Y overlap with each other in the time domain.

BS Perspective

Hereinafter, implementations of the present disclosure will be described again from the BS perspective. According to some implementations of the present disclosure, the BS may receive the PHR from the UE, assuming a UL transmission that is to be used for PHR calculation of the UE for a cell.

Figure 16:
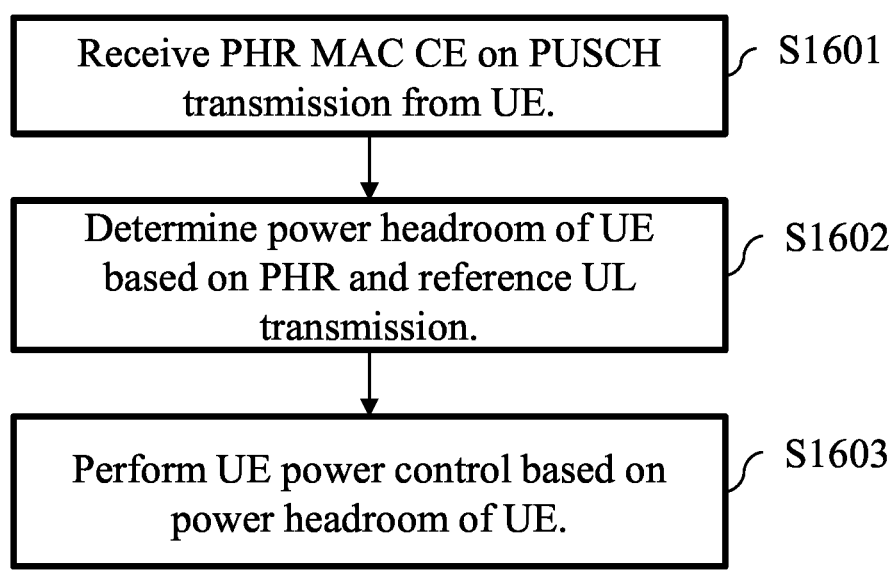
FIG. 16 illustrates a PHR reception flow according to some embodiments of the present disclosure.

FIG. 16 illustrates a PHR reception flow according to some embodiments of the present disclosure.

The BS may transmit an RRC configuration related to the PHR, that is, RRC parameters related to the PHR to the UE. For example, the BS may transmit RRC parameters included in the PHR-Config IE. In addition, the BS may configure parameters related to PUSCH transmission (e.g., PUSCH-Config IE, ConfiguredGrantConfig IE, etc.) for the UE for PHR MAC CE reception. The operation of the BS transmitting the parameters related to the PHR to the UE through RRC signaling may be implemented by the devices of FIG. 2 or 3. For example, referring to FIG. 2, the one or more processors 102 may control the one or more transceivers 106 and/or the one or more memories 104 to transmit the PHR-related parameters to the UE through RRC signaling, and the one or more transceivers 106 may transmit the parameters to the UE through RRC signaling. In some implementations, the higher layer (e.g., RRC) parameters may be transmitted in the RRC connection setup operation in the initial access procedure.

Thereafter, the BS may receive the PHR MAC CE through the PUSCH transmission of the UE (S1601).

In order to accurately identify the actual power headroom of the UE, the BS needs to know the UL transmission used for calculation of the received PHR value. In some embodiments of the present disclosure, the BS may use the reference UL transmission used by the UE for PHR calculation to identify the power headroom of the UE (S1602). For example, the following methods may be considered.

The PHR is calculated based on an indicated/configured high priority UL transmission. In other words, the PHR is calculated on the assumption that there is no indicated/configured low priority transmission. For example, when multiple high priority PUSCH transmissions overlap with each other, a reference UL transmission for PHR calculation may be selected in order of PUSCH with a dynamic grant, and PUSCH with a lowest index configured grant.

The PHR is calculated based on an indicated/configured low priority UL transmission. In other words, the PHR is calculated on the assumption that there is no indicated/configured high priority transmission.

The PHR is calculated based on a scheduling time of a PUSCH on which the PHR is transmitted. That is, after the scheduling time of the PUSCH, the PHR is calculated on the assumption that there is no channel prioritization. This method may be limited to a case where the PUSCH on which the PHR is transmitted is a PUSCH indicated by a dynamic grant (i.e., DCI for scheduling a UL transmission) and/or a case where the PUSCH on which the PHR is transmitted is a high priority PUSCH.

The BS may control the transmission power of the UE based on derived power headroom information about the UE (S1603).

In implementations of the present disclosure, the following BS operations may be considered.

<Implementation B1> In the case where the UE calculates the PHR and two or more UL transmissions are indicated or configured to occupy at least one symbol together at a certain time, the BS may assume that a UL transmission having a specific priority among the two or more UL transmissions is determined as the reference UL transmission for PHR calculation.

According to Implementation B1, in the case where the BS cannot know whether a configured UL transmission (e.g., PUSCH with a configured grant) is performed when performing dynamic scheduling for the UE, an operation between the UE and the BS may be further clarified. For example, when a symbol T is configured to be used by a high priority (HP) configured grant (CG) PUSCH, the BS may schedule a low priority (LP) PUSCH using the symbol T through a dynamic grant (DG). In this case, the UE may selectively transmit an LP DG PUSCH or HP CG PUSCH according to the determination of the MAC layer of the UE and the buffer state. According to Implementation B1, the UE derives a PHR value based on UL transmission of a specific priority regardless of the UL transmission that is actually performed by the UE. Accordingly, the same PHR value may be derived regardless of a UL transmission performed among the two or more UL transmissions indicated/configured for the UE, and BS may expect the same.

Here, the priority may be determined for each UL transmission through L1 signaling and/or higher layer signaling of the BS. For example, the priority of a UL transmission may be determined according to a DCI format indicating the UL transmission, may be determined based on a value of a specific field included in the DCI indicating the UL transmission, or may be configured using RRC parameter(s) (e.g., ConfiguredGrantConfig IE for PUSCH of the configured grant) associated with the UL transmission.

When the priority of UL transmission can be indicated or configured in multiple levels, for example, when one of three or more priority levels can be indicated or configured, the specific priority may be the lowest or highest priority among the multiple priority levels.

In some implementations, the priority of a UL transmission may be determined according to a potential possibility of cancellation of the UL transmission. For example, a UL transmission that may be canceled by a UL cancellation indication or another dynamically scheduled UL transmission may have a lower priority than the other UL transmissions that are not canceled.

<Implementation B1-1> The priority of a UL transmission through which PHR is transmitted may be used to determine the specific priority. That is, the BS may determine a UL transmission used by the UE for PHR calculation based on the priority of a UL transmission through which the PHR is received. For example, when the PHR is received on the LP DG PUSCH in cell A, the BS may assume that a UL transmission of a lower priority (among candidate reference UL transmissions in cell B) has been used as a reference UL transmission for calculation of a PH value for cell B included in the PHR. This operation may match the priority of a transmission channel with the priority of transmitted information, such that lower priority information may be dropped even when channel prioritization of the UE occurs. For example, when the priority of the transmission channel is low and high priority information (e.g., PHR of HP PUSCH) is included in the transmission channel, the high priority information is dropped when the low priority transmission channel is dropped through the channel prioritization. Accordingly, in Implementation B1-1, only low priority information is always included in the low priority channel, such that only low priority information may be dropped even when the low priority channel is dropped.

<Implementation B1-2> On the contrary, the power headroom of the UE may be determined assuming that the UE always sends a PHR calculated based on the high priority UL transmission to help the accurate channel adaptation of the high priority transmission. That is, the BS may assume that the UE always uses the high priority UL transmission as the reference UL transmission for calculation of the PH value. This scheme may be useful when the traffic included in the high priority UL transmission is sporadic.

<Implementation B2> When two or more UL transmissions available for calculation of a PH value overlap with each other in time, the UE may fail to select one UL transmission based on priority alone. For example, when HP CG PUSCH overlaps with HP DG PUSCH, or two or more HP CG PUSCHs overlap with each other, the UE may fail to select one UL transmission based on priority alone. In this case, at least one of the following implementations may be considered.

<Implementation B2-1> When a configured UL transmission and a dynamically scheduled UL transmission that have the same priority or no priority overlap with each other (in time in the cell), the BS may assume that the dynamically scheduled UL transmission is selected as a target UL transmission for the PHR calculation by the UE.

In some implementations, Implementation B2-1 may be extended to include a case where the dynamically scheduled UL transmission is selected in preference to the configured UL transmission regardless of the priorities. In this case, UL transmission by explicit dynamic scheduling of the BS may be prioritized over the semi-statically/semi-persistently configured UL transmission, thereby reducing possible inconsistency between the UE and the BS in terms of reference UL transmission used for PH calculation. This operation may be performed regardless of whether the dynamically scheduled UL transmission is canceled.

<Implementation B2-2> When two or more configured UL transmissions (e.g., configured grant-based PUSCH transmission(s) and/or semi-persistent/periodic SRS transmission) having the same priority or no priority overlap with each other, the BS may assume that one of the configured UL transmissions is selected as a target UL transmission for the PHR calculation by the UE using the following method: a UL transmission with the lowest configuration index is prioritized as the reference UL transmission for calculation of the PH value. In this case, the BS may allow the UE to prioritize a specific CG configuration to use it for PHR calculation through a low configuration index, such that a CG that is more sensitive to reliability may be a target for PHR calculation.

<Implementation B2-3> When two or more UL transmissions having the same priority or having no priority overlap with each other, the BS may assume that one UL transmission is selected as a reference UL transmission for the PHR calculation by the UE according to at least one of the following methods.

When the candidate reference UL transmissions are PUSCH transmissions, a UL transmission using the lowest modulation and coding scheme (MCS) index is selected as a target UL transmission for PHR calculation. In this case, the BS may configure a PUSCH transmission that is more reliability-sensitive to be a target for PHR calculation.

Among the candidate reference UL transmissions, a UL transmission using the highest transmission power $P_{O\_PUSCH}$ is selected as a target UL transmission for PHR calculation. For example, when a nominal power offset p0 (e.g., p0-nominal) and a PUSCH power offset (e.g., a component of P0-PUSCH-AlphaSet or P0-PUSCH-Set) are configurable for PUSCH transmission, and the value of at least one of the offsets is configurable for each UL transmission, the UL transmission using the highest transmission power may be selected as the target UL transmission for PHR calculation. In other words, UL transmission having the largest sum of the nominal power offset p0 and the PUSCH power offset may be selected as the target UL transmission for PHR calculation. Alternatively, a UL transmission having the largest power offset that may be configured for each UL transmission may be selected as the target UL transmission for PHR calculation. In other words, a UL transmission having the largest configured PUSCH power offset may be selected as the target UL transmission for PHR calculation. Alternatively, a UL transmission making the least PHR value may be selected as the target UL transmission for PHR calculation. In this case, the BS may cause the UE to derive and report the least PHR value, which is a PHR value for the worst case, such that the reported power headroom of the UE is not saturated within the report-allowed range.

A UL transmission occupying the largest resource among the candidate reference UL transmissions is selected as the target UL transmission for PHR calculation. According to this method, PHR information for the resource used by the BS to obtain the highest resource efficiency may be acquired because a UL transmission using the largest resource may obtain the highest resource efficiency.

Among the candidate reference UL transmissions, a PUSCH having a shorter UL grant-to-PUSCH timing (e.g., the value of K2 in the indicated TDRA entry) may be prioritized for PHR calculation. In this case, the BS may configure a PUSCH transmission that is more latency-sensitive to be the target for PHR calculation.

Among the candidate reference UL transmissions, a PUSCH whose transmission starts earlier may be prioritized for PHR calculation.

The UE and the BS may select one UL transmission from among multiple UL transmissions by combining some of the multiple methods proposed in Implementation B2 in order. Depending on the importance of the presented advantageous effects, a method having an effect of a higher importance may be applied first. Accordingly, the advantageous effects according to the multiple proposed methods may be obtained through Implementation B2.

<Implementation B3> The BS may assume that the UE applies a TDD UL-DL configuration provided by tdd-UL-DL-ConfigCommon and/or tdd-UL-DL-ConfigDedicated, and/or a slot format indicator provided by DCI format 2_0, before selecting a UL transmission for calculation of the PHR. In other words, the UE may perform the PHR calculation by selecting one of the remaining UL transmissions except for a UL transmission canceled by the TDD operation (e.g., a UL transmission including a symbol indicated as DL (or flexible) indicated by tdd-UL-DL-ConfigCommon, tdd-UL-DL-ConfigDedicated, and/or DCI format 2_0). In this case, by reflecting an actual UL transmission (or a UL transmission except for a UL transmission that is not to be performed due to the TDD operation) in the PHR calculation, the UE may be caused to report a value closer to the actual power headroom of the UE to the BS.

<Implementation B4> The BS may assume that, in selecting a UL transmission for calculation of the PHR, the UE ignores the TDD UL-DL configuration provided by tdd-UL-DL-ConfigCommon and/or tdd-UL-DL-ConfigDedicated, and/or the slot format indicators provided by DCI format 2_0. In other words, the BS may assume that the UE may select one of the candidate reference UL transmissions including a transmission canceled by the TDD operation to perform PHR calculation. In this case, as the TDD operation that may differ among cells is not reflected in the PHR calculation, unnecessary complexity of the PHR calculation may be reduced.

In some implementations, the BS may assume that, before selecting a UL transmission for the PHR calculation, the UE applies the TDD UL-DL configuration provided by tdd-UL-DL-ConfigCommon and/or tdd-UL-DL-ConfigDedicated, and ignores the slot format indicator provided by DCI format 2_0. In this case, as the slot format indicator is not reflected in the PHR calculation, the ambiguity that may occur in the event of DCI loss may be reduced.

<Implementation B5> The BS may assume that the UE applies the information provided by the UL cancellation indication (e.g., DCI format 2_4) to select a UL transmission for calculation of the PHR. In other words, the BS may assume that the UE selects one of the remaining UL transmissions except for a UL transmission canceled by the UL cancellation indication to perform PHR calculation. This operation may allow the UE to report a value closer to the actual power headroom of the UE by reflecting the actual transmission (or a UL transmission other than UL transmissions not to be performed due to the UL cancellation indication) in the PHR calculation.

<Implementation B6> The BS may assume that the UE ignores the information provided by the UL cancellation indication (e.g., DCI format 2_4) in selecting a UL transmission for calculation of the PHR. Here, DCI format 2_4 may be DCI used by the UE to notify the PRB(s) and OFDM symbol(s) for canceling a UL transmission from the UE. In other words, the BS may assume that the UE selects one of the candidate reference UL transmissions including a UL transmission canceled by the UL cancellation indication to perform PHR calculation. In this case, the UL cancellation indication may not be considered or reflected in the PHR calculation, and accordingly the ambiguity that may occur in the event of DCI loss may be reduced.

<Implementation B7> When the PUSCH on which the MAC PDU including the PHR is to be transmitted is canceled by the MAC layer operation of the UE and/or the PHY layer operation of the UE, and thus the MAC PDU may be dropped rather than being transmitted, the BS may assume that, when the MAC PDU is dropped, the UE triggers the PHR again and/or expire the phr-ProhibitTimer. Alternatively, the BS may assume that the UE immediately expires the phr-PeriodicTimer and phr-ProhibitTimer.

In some scenarios, when the PHR is triggered, the MAC layer of the UE may generate a MAC PDU containing a PHR value determined by the reference UL transmission, start or restart the phr-PeriodicTimer and the phr-ProhibitTimer, and cancel all triggered PHRs. That is, when a PDU including the PHR is generated, the UE skips transmitting the PHR for a while using a timer. When the transmission of the MAC PDU containing the PHR is canceled by other operations of the UE, it is difficult for the UE to resend the PHR until the phr-PeriodicTimer and/or phr-ProhibitTimer expires again. Implementation B7 may cause the UE to trigger the PHR again when the PUSCH on which the PHR is transmitted is canceled, thereby minimizing side effects caused by cancellation of the PUSCH for transmission of the PHR and causing the UE to transmit the PHR with a preconfigured periodicity.

<Implementation B8> When a virtual UL transmission with any transmission parameter(s) is used as a reference UL transmission for PHR calculation due to the absence of a scheduled/configured UL transmission to be used for PHR calculation, it may be assumed that an open-loop parameter indication field (refer to Format 0_1 and Format 0_2 of 3GPP 38.212) is not present in the scheduling information (e.g., DCI) for PUSCH, or the field may be assumed to have a specific value (e.g., 0 or 1). Alternatively, it may be assumed that P0-PUSCH-Set is not configured even when P0-PUSCH-Set is configured for the UE by BS through higher layer signaling (e.g., RRC signaling). In this case, the BS may assume that the UE determines the PUSCH transmission power based on the value of P0-PUSCH-AlphaSet without considering the value of P0-PUSCH-Set indicated by the open-loop parameter indication field. According to Implementation B8, when a different p0 offset parameter is allowed to be selected at each scheduling time through the open-loop parameter indication, the changed p0 offset parameter may be allowed to be reflected in the PHR, or one of the values that may be reflected may be used as a fixed specific value. Thereby, ambiguity between the UE and the BS may be reduced.

<Implementation B9> When the PUSCH is used for PHR calculation and when the UE is allowed to use PUSCH repetition type B, the BS may assume that the UE uses the first nominal or actual repetition according to PUSCH scheduling for PHR calculation. The PUSCH repetition type B may include the PUSCH repetition type B described in 3GPP TS 38.214 (see Section 6.3.2 of 3GPP TS 38.214), and may represent a method by which the UE repeats PUSCH transmission based on the given PUSCH scheduling back-to-back at the slot-level or symbol-level as many times as indicated K in the symbols except for some invalid symbol(s).

When the PHR calculation is performed based on the first nominal repetition of the PUSCH scheduling, the BS may assume that the UE calculates the PHR in the same way as when the repetition type B is not used. That is, the BS may assume that, based on the explicit scheduling information indicated or configured by the BS, the UE calculates the PHR in consideration of resource elements occupied by the PUSCH. In this case, the UE may be allowed to operate consistently when different PUSCH repetition types are used in different cells. In addition, the implementation complexity of the UE may be reduced.

When the PHR calculation is performed based on the first actual repetition of the PUSCH scheduling, the BS may assume that the UE calculates the PHR based on the resource region of the actual transmission. That is, the UE may calculate the PHR considering resource elements actually occupied by the first PUSCH instance in consideration of the invalid symbols of the PUSCH transmission as well as explicit scheduling information indicated or configured by the BS. In this case, the actual power headroom of the UE may become similar to the PHR value, and the probability that other UL transmissions unnecessarily overlap with the PUSCH occur may be reduced.

Implementation B9 may be applied to determine whether different UL transmissions overlap with each other in using other proposed implementations of the present disclosure. For example, in determining whether PUSCH X and PUSCH Y, each using PUSCH repetition type B, overlap with each other (in the time domain), overlapping between PUSCH X and PUSCH Y (in the time domain) may be determined in consideration of the first nominal or actual repetition of PUSCH X and PUSCH Y. Specifically, when the first nominal or actual repetition of PUSCH X and PUSCH Y occupies one or more symbols together, it may be determined that PUSCH X and PUSCH Y overlap with each other in the time domain.

Figure 17:
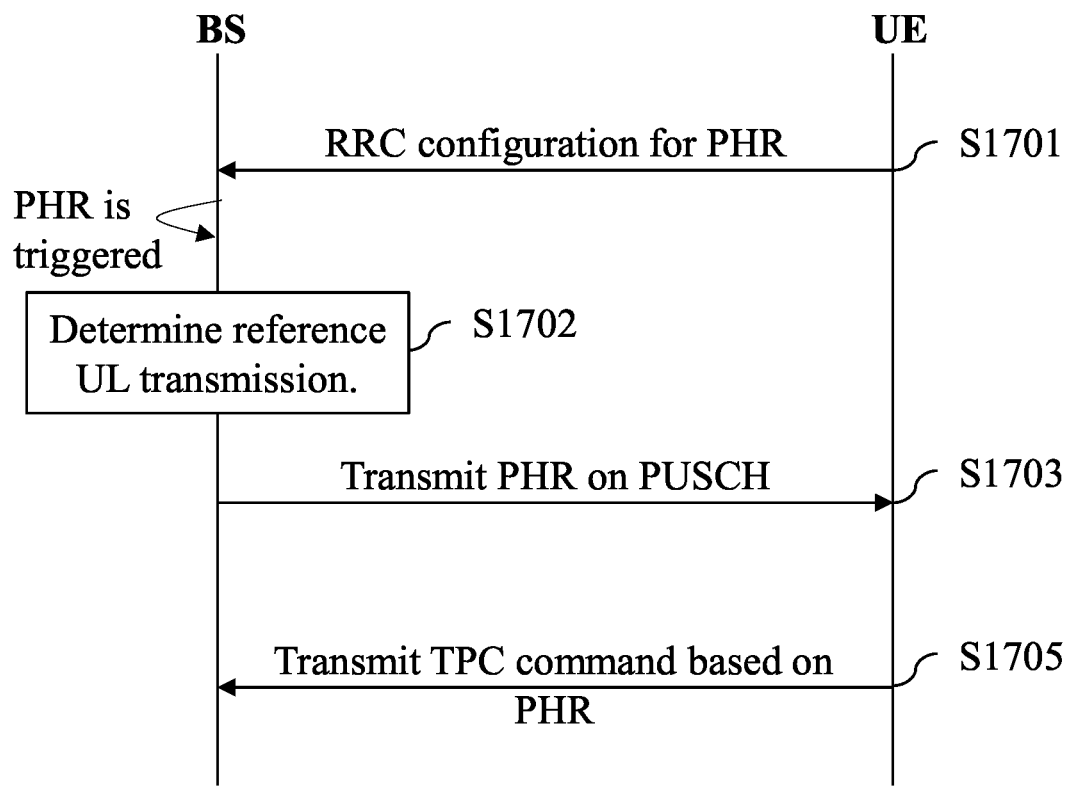
FIG. 17 illustrates a flow of signal transmission/reception between a UE and a BS according to some embodiments of the present disclosure.

FIG. 17 illustrates a flow of signal transmission/reception between a UE and a BS according to some embodiments of the present disclosure.

The UE may receive an RRC configuration related to a PHR from the BS (S1701). When the PHR is triggered in the UE, the UE may determine a UL transmission to be used for PHR calculation based on some implementations of the present disclosure (S1702). A PH value derived based on the determined UL transmission may be included in a PHR MAC CE and provided to the BS through PUSCH transmission (S1703). The BS receiving the PHR MAC CE may control the transmission power of the UE on the assumption of a reference UL transmission of the UE according to some embodiments of the present disclosure (S1705). For example, the BS may transmit a TPC command to the UE based on the received PH value(s) and the reference UL transmission(s) used for the PHR calculation.

According to some embodiments of the present disclosure, it may be expected that the BS and UE will assume the same UL transmission when performing PHR generation and analysis. In addition, according to some embodiments of the present disclosure, the BS may more accurately predict the power headroom of the UE based on the PHR. According to some implementations of the present disclosure, since the UE may calculate the PHR regardless of channel prioritization according to occurrence of high priority traffic, implementation complexity of the UE may be reduced.

Implementations of the present disclosure may be separately applied or at least one thereof may be combined and applied.

The UE may perform operations according to some implementations of the present disclosure in association with transmission of PHR. The UE may include at least one transceiver; at least one processor; and at least one computer memory operably connectable to the at least one processor and storing instructions that, when executed, cause the at least one processor to perform operations according to some implementations of the present disclosure. A processing apparatus for the UE may include at least one processor; and at least one computer memory operably connectable to the at least one processor and storing instructions that, when executed, cause the at least one processor to perform operations according to some implementations of the present disclosure. A computer readable storage medium may store at least one computer program including instructions that, when executed by at least one processor, cause the at least one processor to perform operations according to some implementations of the present disclosure.

In the UE, the processing device, the computer-readable storage medium, and/or the computer program product, the operations include: based on i) power headroom reporting being triggered and ii) a plurality of UL transmissions overlapping with each other in time in a serving cell of the UE for a UL transmission occasion, determining a reference UL transmission among the plurality of UL transmissions; calculating a PH value for the serving cell based on the reference UL transmission; and transmitting the power headroom report (PHR) including the PH value. Determining the reference UL transmission among the plurality of UL transmissions may include determining a UL transmission having a predetermined priority among the plurality of UL transmissions as the reference UL transmission.

In some embodiments of the present disclosure, determining the reference UL transmission among the plurality of UL transmissions may include: based on more than one UL transmission having the predetermined priority among the plurality of UL transmissions, determining a dynamically scheduled UL transmission among the dynamically scheduled UL transmission and a configured UL transmission among the more than one UL transmission as the reference UL transmission.

In some embodiments of the present disclosure, determining the reference UL transmission among the plurality of UL transmissions may include: based on i) more than one UL transmission having the predetermined priority among the plurality of UL transmissions and ii) the more than one UL transmissions being configured UL transmissions, determining a UL transmission having a lowest configuration index among the configured UL transmissions as the reference UL transmission.

In some embodiments of the present disclosure, determining the reference UL transmission among the plurality of UL transmissions may include: based on i) more than one UL transmission having the predetermined priority among the plurality of UL transmissions, determining a UL transmission having a lowest modulation and coding scheme (MCS) index among the more than UL transmission as the reference UL transmission.

In some implementations of the present disclosure, the operations may further include receiving a TDD UL-DL configuration. Determining the reference UL transmission among the plurality of UL transmissions may include: determining the reference UL transmission among remaining UL transmissions except for a UL transmission canceled by the TDD UL-DL configuration.

In some implementations of the present disclosure, the operations may further include receiving DCI including a slot format indicator for the serving cell. Determining the reference UL transmission among the plurality of UL transmissions may include: determining the reference UL transmission among remaining UL transmissions except for a UL transmission canceled by the slot format indicator.

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

INDUSTRIAL APPLICABILITY

The implementations of the present disclosure may be used in a BS, a UE, or other equipment in a wireless communication system.

The invention claimed is:

1. A method by a user equipment (UE), the method comprising:
    receiving configuration information regarding a power headroom report (PHR);
    based on i) the PHR being triggered and ii) a plurality of uplink (UL) transmissions being configured to overlap with each other in time in a serving cell of the UE for a UL transmission occasion, determining a reference UL transmission for calculating a power headroom (PH) value among the plurality of UL transmissions,
    wherein the PHR is triggered based on the configuration information;
    calculating the PH value for the serving cell based on the reference UL transmission; and
    transmitting the PHR including the PH value,
    wherein the reference UL transmission is determined as a UL transmission having a predetermined priority, regardless of whether the UL transmission is actually performed, among the plurality of UL transmissions.

2. The method of claim 1,
    wherein, based on that more than one UL transmission including a dynamically scheduled UL transmission and a configured UL transmission have the predetermined priority among the plurality of UL transmissions, the reference UL transmission is determined as the dynamically scheduled UL transmission.

3. The method of claim 1,
    based on that more than one UL transmission having the predetermined priority among the plurality of UL transmissions are configured UL transmissions, the reference UL transmission is determined as a UL transmission having a lowest configuration index among the configured UL transmissions.

4. The method of claim 1,
    based on more than one UL transmission having the predetermined priority among the plurality of UL transmissions, the reference UL transmission is determined as a UL transmission having a lowest modulation and coding scheme (MCS) index among the more than UL transmission.

5. The method of claim 1, further comprising:
    receiving a time division duplex (TDD) uplink-downlink (UL-DL) configuration,
    wherein
    the reference UL transmission is determined among remaining UL transmissions except for a UL transmission canceled by the TDD UL-DL configuration.

6. The method of claim 1, further comprising:
receiving downlink control information including a slot format indicator for the serving cell,
wherein
the reference UL transmission is determined among remaining UL transmissions except for a UL transmission canceled by the slot format indicator.

7. A user equipment (UE) comprising:
at least one transceiver;
at least one processor; and
at least one computer memory operably connectable to the at least one processor and having stored thereon instructions that, when executed, cause the at least one processor to perform operations, the operations comprising:
receiving configuration information regarding a power headroom report (PHR);
based on i) the PHR being triggered and ii) a plurality of uplink (UL) transmissions being configured to overlap with each other in time in a serving cell of the UE for a UL transmission occasion, determining a reference UL transmission for calculating a power headroom (PH) value among the plurality of UL transmissions,
wherein the PHR is triggered based on the configuration information;
calculating the PH value for the serving cell based on the reference UL transmission; and
transmitting the PHR including the PH value,
wherein the reference UL transmission is determined as a UL transmission having a predetermined priority, regardless of whether the UL transmission is actually performed, among the plurality of UL transmissions.

8. A non-transitory computer-readable storage medium having stored thereon instructions that, when executed by at least one processor, cause the at least one processor to perform operations for a user equipment, the operations comprising:
receiving configuration information regarding a power headroom report (PHR);
based on i) the PHR being triggered and ii) a plurality of uplink (UL) transmissions being configured to overlap with each other in time in a serving cell of the user equipment (UE) for a UL transmission occasion, determining a reference UL transmission for calculating a power headroom (PH) value among the plurality of UL transmissions,
wherein the PHR is triggered based on the configuration information;
calculating the PH value for the serving cell based on the reference UL transmission; and
transmitting a power headroom report (PHR) comprising the PH value,
wherein the reference UL transmission is determined as a UL transmission having a predetermined priority, regardless of whether the UL transmission is actually performed, among the plurality of UL transmissions.

* * * * *